United States Patent
Aggarwal et al.

(10) Patent No.: US 8,571,029 B1
(45) Date of Patent: Oct. 29, 2013

(54) LABEL SWITCHED PATH HIERARCHY FOR INTRA-AREA SEGMENTS OF INTER-AREA POINT-TO-MULTIPOINT LABEL SWITCHED PATHS

(75) Inventors: Rahul Aggarwal, San Francisco, CA (US); Yakov Rekhter, New Rochelle, NY (US)

(73) Assignee: Juniper Networks, Inc., Sunnyvale, CA (US)

(*) Notice: Subject to any disclaimer, the term of this patent is extended or adjusted under 35 U.S.C. 154(b) by 141 days.

(21) Appl. No.: 12/980,106

(22) Filed: Dec. 28, 2010

Related U.S. Application Data

(60) Provisional application No. 61/413,129, filed on Nov. 12, 2010.

(51) Int. Cl.
*H04L 12/28* (2006.01)
*H04L 12/56* (2011.01)

(52) U.S. Cl.
USPC .......................................... 370/390; 370/256

(58) Field of Classification Search
USPC .......................................... 370/389–392, 256
See application file for complete search history.

(56) References Cited

U.S. PATENT DOCUMENTS

| | | | |
|---|---|---|---|
| 7,519,010 B1* | 4/2009 | Aggarwal et al. | 370/254 |
| 7,936,780 B1* | 5/2011 | Kompella | 370/466 |
| 7,957,386 B1* | 6/2011 | Aggarwal et al. | 370/392 |
| 8,233,479 B2* | 7/2012 | Wijnands et al. | 370/389 |
| 2009/0175274 A1* | 7/2009 | Aggarwal et al. | 370/390 |
| 2009/0268731 A1* | 10/2009 | Narayanan et al. | 370/390 |
| 2010/0177631 A1* | 7/2010 | Chen et al. | 370/221 |
| 2011/0206045 A1* | 8/2011 | Wijnands et al. | 370/390 |
| 2011/0292937 A1* | 12/2011 | Gupta et al. | 370/390 |
| 2012/0027013 A1* | 2/2012 | Napierala | 370/390 |
| 2012/0092986 A1* | 4/2012 | Chen | 370/228 |
| 2012/0155327 A1* | 6/2012 | Fondelli et al. | 370/254 |
| 2012/0294193 A1* | 11/2012 | Chen et al. | 370/255 |
| 2013/0107725 A1* | 5/2013 | Jeng et al. | 370/248 |

OTHER PUBLICATIONS

Hawkinson et al., "Guidelines for creation, selection, and registration of an Autonomous System (AS)," RFC 1930, Mar. 1996, 11 pp.
Rekhter et al., "Inter-Area P2MP Segmented LSPs," draft-raggarwa-mpls-seamless-mcast-00.txt, Mar. 1, 2010, 16 pp.
U.S. Appl. No. 12/980,080, by Rahul Aggarwal, filed Dec. 28, 2010.
Office Action from U.S. Appl. No. 12/980,080, dated Sep. 17, 2012, 22 pp.
Response to Non-Final Office Action dated Sep. 17, 2012, from U.S. Appl. No. 12/980,080, filed Jan. 18, 2013, 21 pp.

* cited by examiner

*Primary Examiner* — Chuong T Ho
(74) *Attorney, Agent, or Firm* — Shumaker & Sieffert, P.A.

(57) ABSTRACT

In general, techniques are described for providing multicast communication in a seamless MPLS architecture, in which thousands of PE routers within different routing areas of the same AS require P2MP connectivity to receive multicast communication. In particular, the techniques enable building inter-area P2MP segmented LSPs within an AS by stitching together intra-area segments of the inter-area P2MP segmented LSPs. The techniques provide LSP hierarchy with segmentation to enable aggregation of congruent intra-area segments within a routing area into an intra-area aggregate LSP. The AS may use the BGP as the inter-area label distribution protocol, and each routing area within the AS may independently select one of the multicast MPLS protocols as its intra-area label distribution protocol. The seamless MPLS architecture may be used by private network instances, such as multicast VPLS instances, MVPN instances, and IP multicast instances.

27 Claims, 10 Drawing Sheets

LABEL SWITCHED PATH HIERARCHY FOR INTRA-AREA SEGMENTS OF INTER-AREA POINT-TO-MULTIPOINT LABEL SWITCHED PATHS

PRIORITY CLAIM

This application claims the benefit of U.S. Provisional Application No. 61/413,129, filed Nov. 12, 2010, the entire content of which is incorporated herein by reference.

TECHNICAL FIELD

The invention relates to computer networks and, more particularly, to private network instances established over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Private network instances are often used to extend two or more remote customer networks, i.e., private network sites, through a public network, such as the Internet. In some cases, private network instances may be configured to carry multicast traffic, such as Internet Protocol Television (IPTV), desktop conferences, corporate broadcasts, music and video web casts, and other forms of multimedia content. These multicast private network instances include, for example, multicast virtual private local area network service (multicast VPLS) instances, multicast virtual private network (MVPN) instances, and Internet Protocol (IP) multicast instances. In particular, multicast VPLS instances transport layer two (L2) multicast communications, e.g., Ethernet packets, and MVPN instances and IP multicast instances transport layer three (L3) multicast communications, e.g., IP packets, between the customer sites via the public network.

In a typical configuration, provider edge (PE) routers coupled to the customer networks define point-to-multipoint (P2MP) label switched paths (LSPs) within the public network to carry L2 and/or L3 multicast communications as if these customer networks were directly attached to the same private network. In order to discover the private network memberships of PE routers within the public network, each of the PE routers may perform auto-discovery using a routing protocol, such as the border gateway protocol (BGP). After discovering the member PE routes, multicast multi-protocol label switching (MPLS) protocols, including the multicast label distribution protocol (mLDP) and the resource reservation protocol with traffic engineering (RSVP-TE), may then be used to setup P2MP LSPs between the discovered PE routers that belong to the same private network instances.

The need for multicast MPLS is being pushed further to the metro edge of the public network where customer networks are connected together via private network instances. The public network may comprise an autonomous system (AS), which may be logically divided into multiple routing areas, such as interior gateway protocol (IGP) areas. Extending multicast MPLS to these networks comprised of a single AS with multiple routing areas is often referred to as providing seamless MPLS. In the case of seamless MPLS, thousands of PE routers within different routing areas of the same AS require P2MP connectivity to receive multicast communication. The multicast MPLS protocols, however, do not adequately scale to provide multicast communication in this seamless MPLS architecture.

SUMMARY

In general, techniques are described for providing multicast communication in a seamless Multi-Protocol Label Switching (MPLS) architecture with improved scalability. The seamless MPLS architecture may include thousands of provider edge (PE) routers within different routing areas of the same Autonomous System (AS) that require point-to-multipoint (P2MP) connectivity to receive multicast communication for associated customer networks. In particular, the techniques enable building of inter-area P2MP segmented label switched paths (LSPs) within an AS by stitching together intra-area segments of the inter-area P2MP segments LSPs.

Within each routing area of the AS, intra-area LSPs may be established to carry intra-area segments of the inter-area P2MP segmented LSPs. In some examples, the intra-area LSPs may be used solely to carry intra-area segments of a particular inter-area P2MP segmented LSP. In other examples, the intra-area LSPs may comprise intra-area aggregate LSPs used to carry two or more intra-area segments of different inter-area P2MP segmented LSPs. For the latter case, the techniques described herein provide LSP hierarchy with segmentation to enable aggregation of congruent or partially congruent intra-area segments within a routing area into an intra-area aggregate LSP. In this way, the seamless MPLS architecture may gain the benefits of LSP hierarchy within the routing areas regardless of whether the inter-area P2MP segmented LSPs are even partially congruent across the AS.

The AS may use the Border Gateway Protocol (BGP) as the inter-area label distribution protocol, and each routing area within the AS may independently select one of the multicast MPLS protocols, e.g., the multicast label distribution protocol (mLDP) or the resource reservation protocol with traffic engineering (RSVP-TE), as its intra-area label distribution protocol. The seamless MPLS architecture may exist near the metro edge of a public network where customer networks are connected together via private network instances, such as multicast virtual private local area network service (multicast VPLS) instances, multicast virtual private network (MVPN) instances, and Internet protocol (IP) multicast instances.

In one example, this disclosure is directed to a method comprising establishing a first inter-area P2MP segmented LSP across two or more routing areas within an AS of a public network by stitching together intra-area segments of the first inter-area P2MP segmented LSP within each of the routing areas, and establishing a second inter-area P2MP segmented LSP across two or more routing areas within the AS by stitching together intra-area segments of the second inter-area P2MP segmented LSP within each of the routing areas. The method further comprises establishing an intra-area aggregate LSP within at least one of the routing areas using LSP hierarchy to carry a first intra-area segment of the first inter-area P2MP segmented LSP and a second intra-area segment of the second inter-area P2MP segmented LSP.

In another example, this disclosure is directed to a network system of an AS of a public network, the network system comprising a first inter-area P2MP segmented LSP within the AS established across two or more routing areas of the AS by stitching together intra-area segments of the first inter-area P2MP segmented LSP within each of the routing areas, and a second inter-area P2MP segmented LSP established across two or more routing areas of the AS by stitching together intra-area segments of the second inter-area P2MP segmented LSP within each of the routing areas. The network system also includes a network device within one of the routing areas of the AS that establishes an intra-area aggregate LSP within the routing area using LSP hierarchy to carry a first intra-area segment of the first inter-area P2MP segmented LSP and a second intra-area segment of the second inter-area P2MP segmented LSP.

In a further example, this disclosure is directed to a network device within a routing area of an AS of a public network, the network device comprising a control unit that establishes an intra-area aggregate LSP within the routing area using LSP hierarchy to carry a first intra-area segment of a first inter-area P2MP segmented LSP within the AS and a second intra-area segment of a second inter-area P2MP segmented LSP within the AS. The first inter-area P2MP segmented LSP is established across two or more routing areas of the AS by stitching together intra-area segments of the first inter-area P2MP segmented LSP within each of the routing areas, and the second inter-area P2MP segmented LSP is established across two or more routing areas of the AS by stitching together intra-area segments of the second inter-area P2MP segmented LSP within each of the routing areas.

In another example, this disclosure is direct to a computer-readable storage medium encoded with instructions for causing one or more programmable processors to establish a first inter-area P2MP segmented LSP across two or more routing areas within an AS of a public network by stitching together intra-area segments of the first inter-area P2MP segmented LSP within each of the routing areas, and establish a second inter-area P2MP segmented LSP across two or more routing areas within the AS by stitching together intra-area segments of the second inter-area P2MP segmented LSP within each of the routing areas. The instructions also cause the programmable processors to establish an intra-area aggregate LSP within at least one of the routing areas using LSP hierarchy to carry a first intra-area segment of the first inter-area P2MP segmented LSP and a second intra-area segment of the second inter-area P2MP segmented LSP.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

FIG. 2 is a block diagram illustrating an exemplary inter-area P2MP segmented LSP across multiple routing areas of the same AS.

FIG. 6 is a block diagram illustrating an exemplary router that establishes an intra-area LSP within a routing area of an AS to carry an intra-area segment of an inter-area P2MP segmented LSP within the AS.

DETAILED DESCRIPTION

Figure 1:
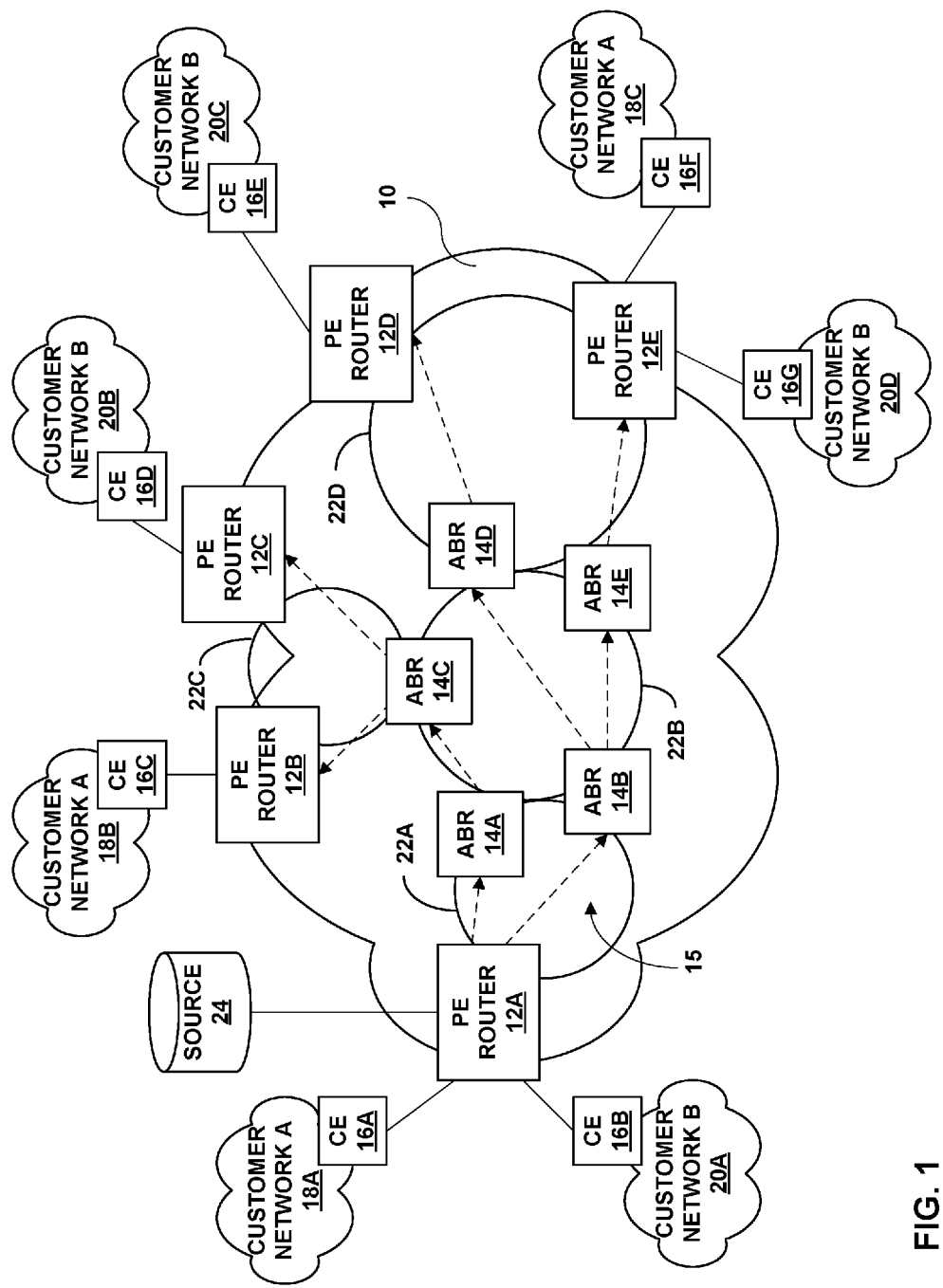
FIG. 1 is a block diagram illustrating an example public network 10 with a seamless MPLS architecture near its metro edge that implements the techniques described in this disclosure.

FIG. 1 is a block diagram illustrating an example public network 10 with a seamless Multi-Protocol Label Switching (MPLS) architecture near its metro edge that implements the techniques described in this disclosure. In the example of FIG. 1, public network 10 includes provider edge (PE) routers 12A-12F ("PE routers 12") that receive multicast communication for customer networks A 18A-18C ("customer networks A 18") and customer networks B 20A-20D ("customer networks B 20"). At the metro edge of public network 10, thousands of PE routers similar to PE routers 12 may require point-to-multipoint (P2MP) connectivity to receive the multicast communications requested by the customer networks. Techniques are described in this disclosure to provide multicast communication to the seamless MPLS architecture with improved scalability. In particular, the techniques enable building an inter-area P2MP segmented label switched path (LSP) 15 within an Autonomous System (AS) of public network 10 by stitching together intra-area segments of inter-area P2MP segmented LSP 15.

Public network 10 may comprise the Internet or another MPLS network. In the illustrated example, public network 10 comprises an AS logically divided into multiple routing areas 22A-22D ("routing areas 22"). PE router 12A configures an inter-area P2MP segmented LSP 15 within the AS of public network 10 to provide multicast communication to PE routers 12 at the metro edge of public network 10.

The AS of public network 10 comprises a collection of connected Internet Protocol (IP) routing prefixes under the control of one or more network service providers that presents a common, clearly defined routing policy to public network 10. Autonomous systems are described in further detail in J. Hawkinson & T. Bates, RFC 1930, "Guidelines for creation, selection, and registration of an Autonomous System (AS)," Network Working Group, March 1996, which is incorporated herein by reference in its entirety. An interior gateway protocol (IGP) is a routing protocol used to exchange routing information within an AS. The more widely-used IGPs may include Open Path Shortest First (OPSF) and Intermediate system to intermediate system (IS-IS). In some examples, public network 10 may comprise more than one AS. An exterior gateway protocol is a routing protocol used to exchange routing information between two or more autonomous systems. The most widely-used exterior gateway protocol is the Border Gateway Protocol (BGP).

Routing areas 22 within the AS of public network 10 may comprise IGP areas. More specifically, routing areas 22 are logical groups of hosts and networks within the AS of public network 10. Each of routing areas 22 maintains a separate link state database whose information may be summarized to the other routing areas 22 within the AS, but the topology of each of routing areas 22 is unknown outside of that area. In this way, each of routing areas 22 maintains its own link state information, but does not maintain link state information for any of the other routing areas 22 within the AS. The use of routing areas 22 reduces an amount of routing information communicated within the AS.

In the illustrated example, PE routers 12 support a private network A instance that extends customer networks A 18 through public network 10, and a private network B instance that extends customer networks B 20 through public network 10. The private network A and B instances may be configured to carry multicast traffic and comprise multicast virtual private local area network service (multicast VPLS) instances, multicast virtual private network (MVPN) instances, or Internet protocol (IP) multicast instances. Each of customer networks A 18 and customer networks B 20 may comprise a remote customer network that includes a local area network (LAN) or a wide area network (WAN) with a plurality of subscriber devices, such as desktop computers, laptops, workstations, PDAs, wireless devices, network-ready appliances, file servers, print servers or other devices.

Each of PE routers 12 couples to one or more of customer networks A 18 or customer networks B 20 via customer edge (CE) routers 16A-16G ("CE routers 16"). For example, PE router 12A is coupled to customer network A 18A and customer network B 20A via CE router 16A and CE router 16B, respectively. PE router 12A is also coupled to multicast source 24. PE router 12B is coupled to customer network A 18B via CE router 16C. PE router 12C is coupled to customer network B 20B via CE router 16D. PE router 12D is coupled to customer network B 20C via CE router 16E. PE router 12E is coupled to customer network A 18C and customer network B 20D via CE router 16F and CE router 16G, respectively.

Routing areas 22 for inter-area P2MP segmented LSP 15 may include ingress routing area 22A, backbone routing area 22B, and egress routing areas 22C and 22D. Ingress routing area 22A includes PE router 12A, which is the root node of inter-area P2MP segmented LSP 15. The root node refers to a network device, in this case PE router 12A, that originates multicast traffic received from one or more of source 24 and its customer networks, in this case customer network A 18A and customer network B 20A, for inter-area P2MP segmented LSP 15. Egress routing area 22C includes PE router 12B and PE router 12C, which are two leaf nodes of inter-area P2MP segmented LSP 15. Egress routing area 22D includes PE router 12D and PE router 12E, which are two leaf nodes of inter-area P2MP segmented LSP. The leaf nodes refer to network devices, in this case PE routers 12B-12E, that terminate a branch of inter-area P2MP segmented LSP 15 and transmit any multicast traffic carried over the branch to its customer networks, in this case one or more of customer networks A 18B-18C or customer networks B 20B-20D.

Backbone routing area 22B operates as a conduit between ingress routing area 22A and egress routing areas 22C and 22D. More specifically, backbone routing area 22B forms the core of the AS of public network 10 and all other ingress and egress routing areas within the AS are connected to backbone routing area 22B. Backbone routing area 22B is responsible for distributing routing information between the other routing areas 22. Routing areas 22 are connected to each other within the AS of public network 10 via area border routers (ABRs) 14A-14E ("ABRs 14"). For example, ingress ABR 14A and ingress ABR 14B are included within ingress routing area 22A and connect ingress routing area 22A to backbone area 22B. Egress ABR 14C is included within egress routing area 22C and connects egress routing area 22C to backbone routing area 22B. Egress ABR 14D and egress ABR 14E are included in egress routing area 22D and connect egress routing area 22D to backbone routing area 22B.

In accordance with the techniques described in this disclosure, inter-area P2MP segmented LSP 15 is established between root node PE router 12A and leaf nodes PE routers 12B-12E by establishing intra-area LSPs within each of routing areas 22 to carry intra-area segments of inter-area P2MP segmented LSP 15 and stitching the intra-area segments together to establish inter-area P2MP segmented LSP 15. More specifically, the intra-area LSPs are established within each of routing areas 22 by advertising a BGP Leaf auto-discovery route for an intra-area segment of inter-area P2MP segmented LSP 15 within each of routing areas 22, and establishing the intra-area LSPs within each of routing areas 22 based on the BGP Leaf auto-discovery route for the intra-area segment using a multicast Multi-Protocol Label Switching (MPLS) protocol. The multicast MPLS protocol used to establish the intra-area LSPs within each of routing areas 22 may include the multicast label distribution protocol (mLDP) and the resource reservation protocol with traffic engineering (RSVP-TE). ABRs 14 act as route reflectors for BGP auto-discovery routes.

Once the intra-area LSPs are established within each of routing areas 22, PE router 12A and ABRs 14 may perform binding of the intra-area LSPs to inter-area P2MP segmented LSP 15 within each of routing areas 22. More specifically, PE router 12A and ABRs 14 may advertise the binding using BGP Provider Multicast Service Interface (PMSI) auto-discovery routes for inter-area P2MP segmented LSP 15 that each includes an identity of the intra-area LSP and an upstream-assigned MPLS label of the intra-area segment within the routing area. In the case where the intra-area LSP is used solely for inter-area P2MP segmented LSP 15, the MPLS label in the BGP PMSI auto-discovery route is set to null. In examples where the service carried by inter-area P2MP segmented LSP 15 is IP multicast, the intra-area LSPs within egress routing areas 22C and 22D may not be bound to inter-area P2MP segmented LSP 15, and one or more leaf nodes PE routers 12B-12E of inter-area P2MP segmented LSP 15 may forward multicast traffic using IP multicast forwarding information stored in leaf nodes 12B-12E.

Upon receiving the binding advertisements, ABRs 14 may stitch together the intra-area segments carried within the intra-area LSPs to establish inter-area P2MP segmented LSP 15. For example, ingress ABRs 14A-14B may stitch the intra-area segment within ingress routing area 22A to the intra-area segments within backbone routing area 22B. In addition, egress ABRs 14C-14E may stitch the intra-area segments within backbone routing area 22B to the intra-area segments within egress routing areas 22C-22D. More specifically, ABRs 14 may stitch together the intra-area segments of inter-area P2MP segmented LSP 15 by associating a leaf node of a first intra-area LSP with a root node of a second intra-area LSP within adjacent routing areas. The leaf node and root node of the intra-area LSPs within the adjacent routing areas occur at the same ABR. In some cases, each of ABRs 14 may set the BGP next hop of inter-area P2MP segmented LSP 15 to itself. In this way, each of ABRs 14 may receive traffic as a leaf node of an intra-area LSP within one of routing areas 22 and send the traffic to itself to be pushed into an intra-area LSP within another one or routing areas 22 for which it acts as the root node.

In the examples described above, intra-area LSPs are established within each of routing areas 22 solely to carry intra-area segments of inter-area P2MP segmented LSP 15. In other examples, however, the intra-area LSPs established within each of routing areas 22 may comprise intra-area aggregate LSPs used to carry two or more intra-area segments of different inter-area P2MP segmented LSPs. Techniques are described herein to provide LSP hierarchy with segmentation to enable aggregation of congruent or partially congruent intra-area segments within each of routing areas 22 into intra-area aggregate LSPs.

In some instances, multiple inter-area P2MP segmented LSPs may be established between root node PE router 12A and leaf nodes PE routers 12B-12E. These multiple inter-area P2MP segmented LSPs may be configured by establishing intra-area aggregate LSPs within some of routing areas 22 using LSP hierarchy to carry multiple congruent or partially congruent intra-area segments of the multiple inter-area P2MP segmented LSPs. For example, if the intra-area segments of two different inter-area P2MP segmented LSPs are fully or partially congruent within egress routing area 22C, then egress ABR 14C may establish an intra-area aggregate LSP within egress routing area 22C. Egress ABR 14C may then nest the two intra-area segments of the two different inter-area P2MP segmented LSPs in the intra-area aggregate LSP within egress routing area 22C. Each of the intra-area segments in the intra-area aggregate LSP may be separately stitched to intra-area segments of its respective inter-area P2MP segmented LSP within backbone routing area 22B.

The intra-area aggregate LSP effectively encapsulates the two intra-area segments of the two different inter-area P2MP segmented LSPs to reduce the amount of labels that must be learned by those label switched routers (LSRs) intermediate to ABR 14C and PE routers 12B, 12C (which are not shown in the example of FIG. 1 for ease of illustration). Instead of signaling two labels to each of these intermediate LSRs, one for each of the two intra-area segments of the two different inter-area P2MP segmented LSPs, ABR 14C need only signal the single label associated with the intra-area aggregate LSP to each of these intermediate LSRs.

Moreover, the binding of the intra-area aggregate LSP to each of the inter-area P2MP segmented LSPs may be performed using BGP PMSI auto-discovery routes for the inter-area P2MP segmented LSPs that each include an identity of the intra-area aggregate LSP and an upstream-assigned MPLS label of the respective intra-area segment carried by the intra-area aggregate LSP. In this case, the MPLS label for each of the intra-area segments is included in a label stack of the BGP PMSI auto-discovery route for the respective one of the inter-area P2MP segmented LSPs.

The techniques described in this disclosure improve scalability for seamless MPLS multicast by reducing an amount of overhead conventionally associated with tracking leaf node forwarding and routing information in a node of a P2MP LSP. In this case, the root node of an intra-area LSP only needs to know the leaf nodes of that intra-area LSP and does not need to know the leaf nodes of the inter-area P2MP segmented LSP of the intra-area segment carried in the intra-area LSP. This may be especially advantageous when the intra-area LSP comprises an intra-area aggregate LSP that carries intra-area segments of multiple different inter-area P2MP segmented LSPs. In this way, the root node of the intra-area aggregate LSP only needs to track leaf node forwarding and routing information for leaf nodes of each of the intra-area segments nested within the inter-area aggregate LSP, and not for each of the multiple different inter-area P2MP segmented LSPs.

The techniques also allow the AS to use BGP as the inter-area label distribution protocol, and allow each of the routing areas within the AS to independently use one of the multicast MPLS protocols, e.g., mLDP or RSVP-TE, as its intra-area label distribution protocol. Since the scope of a given intra-area label distribution protocol is generally limited to a single routing area, neighboring routing areas may use different intra-area label distribution protocols. The techniques are also applicable to inter-area P2MP segmented LSPs carrying multicast services, including multicast VPLS instances, MVPN instances, and IP multicast instances. Moreover, the techniques described herein for seamless MPLS multicast may be used with seamless MPLS unicast.

In addition, the LSP hierarchy with segmentation techniques further improve scalability for seamless MPLS multicast by enabling aggregation of intra-area segments within the routing areas regardless of the congruency of the associated inter-area P2MP segmented LSPs. For example, two inter-area P2MP segmented LSPs that have no or few common leaf nodes may have fully congruent intra-area segments. Aggregating the two inter-area P2MP segmented LSPs would result in bandwidth inefficiencies as the leaf nodes would have to discard large quantities of undesired multicast information. In this case, the techniques provide for aggregation of only the fully congruent intra-area segments to take advantage of aggregation without bandwidth inefficiencies due to partial congruence.

As another example, two inter-area P2MP segmented LSPs that have different root nodes may have fully or partially congruent intra-area segments. The two inter-area P2MP segmented LSPs cannot be aggregated. In this case, the techniques provide for aggregation of only the fully or partially congruent intra-area segments to take advantage of aggregation even if the associated inter-area P2MP segmented LSPs are not even partially congruent.

Figure 2:
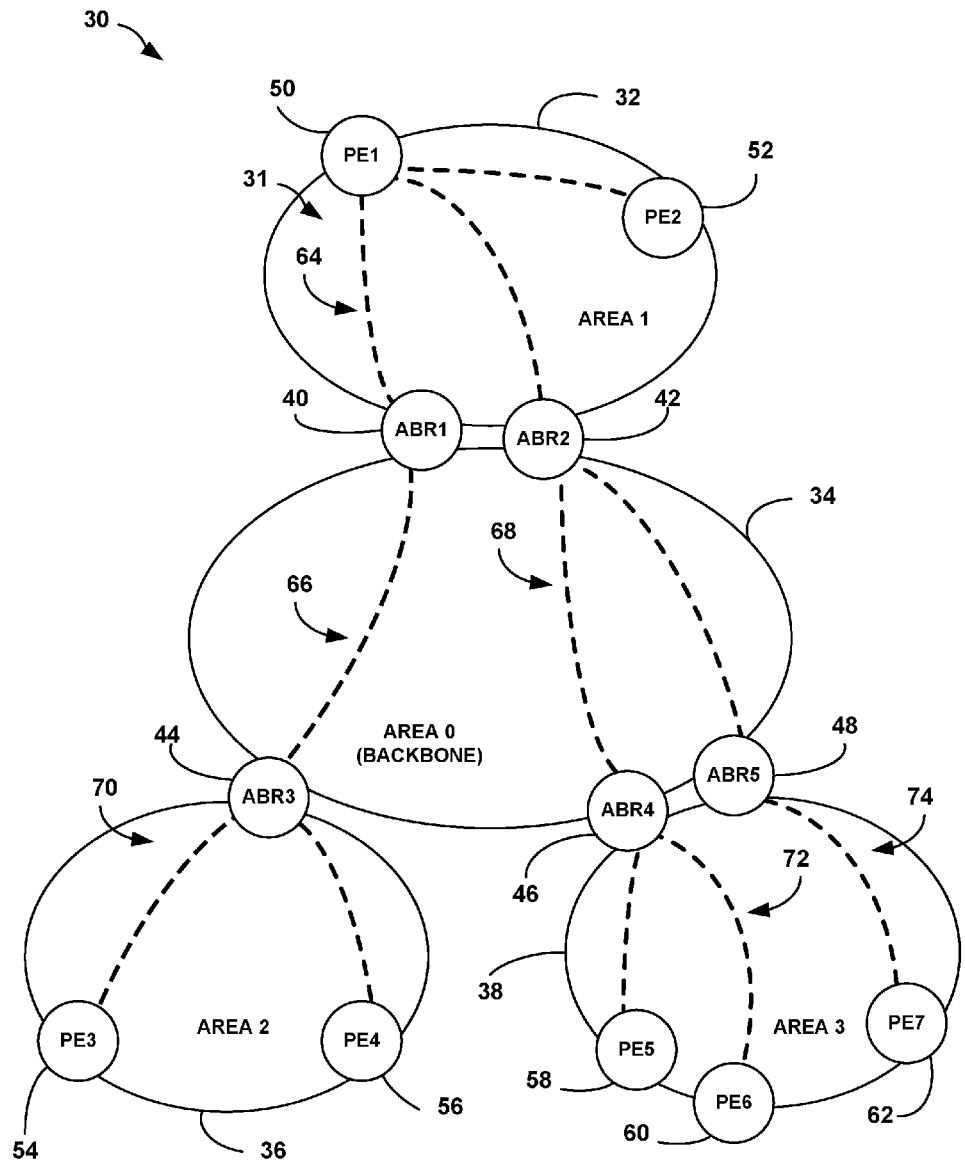

FIG. 2 is a block diagram illustrating an exemplary inter-area P2MP segmented LSP 31 (represented as a dashed line) across multiple routing areas 32, 34, 36 and 38 of the same AS 30. In some examples, AS 30 may comprise all or a portion of a public network, similar to public network 10 from FIG. 1. As illustrated in FIG. 2, AS 30 is logically divided according to hosts and networks included in AS 30 into multiple routing areas 32, 34, 36 and 38. Routing areas 32, 34, 36 and 38 may be IGP areas. Routing areas 32, 34, 46 and 38 of AS 30 may be included in a seamless MPLS architecture that exists near the metro edge of a public network.

In accordance with the techniques described herein, inter-area P2MP segmented LSP 31 is built by stitching together intra-area segments within each of the routing areas 32, 34, 36 and 38 to provide the PE routers within the routing areas with P2MP connectivity to receive multicast communication. In some examples, the intra-area segments may comprise separate intra-area LSPs used solely for inter-area P2MP segmented LSP 31. In other examples, the intra-area segments may be nested within intra-area aggregate LSPs used for inter-area P2MP segmented LSP 31 and one or more other inter-area P2MP segmented LSPs. This aggregation may be performed using LSP hierarchy with segmentation techniques described in more detail below. Most commonly, the intra-area segments will comprise P2MP LSP segments.

AS 30 includes an ingress area 32 (i.e., Area 1), a backbone area 34 (i.e., Area 0), a first egress area 36 (i.e., Area 2), and a second egress area 38 (i.e., Area 3) of inter-area P2MP segmented LSP 31. Ingress area 32 and egress areas 36, 38 include PE routers that connect to customer networks and area border routers (ABRs) that connect to backbone area 34. Ingress area 32 includes ingress PE1 50, ingress PE2 52, ingress ABR1 40, and ingress ABR2 42. Ingress PE1 50 is the root node of inter-area P2MP segmented LSP 31. In some examples, inter-area P2MP segmented LSP 31 may comprise an intra-AS segment of an inter-AS P2MP segmented LSP such that ingress PE1 50 may comprise an Asynchronous System border router (ASBR) of AS 30. Ingress area 32 also includes ingress area segment 64, which is an intra-area P2MP LSP with ingress PE1 50 as its root node and ingress PE2 52, ingress ABR1 40, and ingress ABR2 42 as its leaf nodes. A given inter-area P2MP segmented LSP can only have one root node and, therefore, only has one ingress area. In addition, an inter-area P2MP segmented LSP can only have one ingress area segment with the same root node as the inter-area P2MP segmented LSP and one or more ingress ABRs as the leaf nodes.

First egress area 36 includes egress PE3 54, egress PE4 56, and egress ABR3 44. Egress PE3 54 and egress PE4 56 are leaf nodes of inter-area P2MP segmented LSP 31. First egress area 36 also includes egress area segment 70, which is an intra-area P2MP LSP with egress ABR3 44 as its root node and egress PE3 54 and egress PE4 56 as its leaf nodes. Second egress area 38 includes egress PE5 58, egress PE6 60, egress PE7 62, egress ABR4 46, and egress ABR5 48. Egress PE5 58, egress PE6 60, and egress PE7 62 are leaf nodes of inter-area P2MP segmented LSP 31. Second egress area 38 also includes first egress area segment 72, which is an intra-area P2MP LSP with egress ABR4 46 as its root node and egress PE5 58 and egress PE6 60 as its leaf nodes, and second egress area segment 74, which is an intra-area P2P LSP with egress ABR5 48 as its root node and egress PE7 62 as its leaf node. A given inter-area P2MP segmented LSP may have more than one leaf PE router within more than one routing area and, therefore, may have one or more egress areas. Moreover, an inter-area P2MP segmented LSP can have one or more egress area segments, each with an egress ABR as the root node and one or more of the same leaf nodes as the inter-area P2MP segmented LSP.

Backbone area 34 is connected to ingress area 32 via ingress ABR1 40 and ingress ABR 2 42, is connected to egress area 36 via egress ABR3 44, and is connected to egress area 38 via ABR4 46 and ABR5 48. Backbone area 34 includes first backbone area segment 66, which is an intra-area P2P LSP with ABR1 40 as its root node and ABR3 44 as its leaf node, and second backbone area segment 68, which is an intra-area P2MP LSP with ABR2 42 as its root node and ABR4 46 and ABR5 48 as its leaf nodes. A given inter-area P2MP segmented LSP may have only one backbone area that connects the one ingress area to the one or more egress areas. An inter-area P2MP segmented LSP can have one or more backbone area segments, each with an ingress ABR as the root node and one or more egress ABRs as the leaf nodes.

Inter-area P2MP segmented LSP 31 may be used by private network services configured to carry multicast traffic, such as multicast VPLS, MVPN, and IP multicast, to provide MPLS multicast to the metro edge of public network 10. Each of the private network services may use different signaling procedures to build inter-area P2MP segmented LSP 31 by stitching together intra-area segments within each of the routing areas 32, 34, 36 and 38. The specific signaling procedures for each of the multicast VPLS, MVPN, and IP multicast will be described in more detail below.

Regardless of the private network service, the building procedures first include discovering the identity of inter-area P2MP segmented LSP 31 based on its P2MP Forwarding Equivalence Class (FEC). Second, the building procedures include advertising the route from the leaf nodes to the root node of inter-area P2MP segmented LSP 31. Third, the building procedures include building intra-area LSPs to carry intra-area segments of inter-area P2MP segmented LSP 31 within each of routing areas 32, 34, 36, and 38 based on the advertised route using a multicast MPLS protocol. Each of the routing areas may independently select one of the multicast MPLS protocols, e.g., mLDP or RSVP-TE, as its intra-area label distribution protocol. Fourth, the building procedures include stitching the intra-area segments together to form inter-area P2MP segmented LSP 31 using BGP. In some cases, the building procedures also include advertising a binding the intra-area LSPs to inter-area P2MP segmented LSP 31 within each of the routing areas again using BGP. For example, AS 30 may use BGP as its inter-area label distribution protocol. In some cases, the building procedures may not occur as discrete steps, but instead may occur simultaneously within different areas of inter-area P2MP segmented LSP 31.

Within egress routing areas 36 and 38, egress PE3 54, PE4 56, PE5 58, PE6 60, and PE7 62 first discover the P2MP FEC of inter-area P2MP segmented LSP 31 either by configuration or based on specific signaling procedures for the type of private network service using inter-area P2MP segmented LSP 31. Once the egress PEs discover the P2MP FEC of inter-area P2MP segmented LSP 31, each of the egress PEs originates a Leaf auto-discovery route toward root node PE1 50 using BGP to initiate the building of inter-area P2MP segmented LSP 31. For example, upon determining the address of root node PE1 50, egress PE3 54 and egress PE4 56 each originate a BGP Leaf auto-discovery route, which is advertised to egress ABR3 44. As another example, upon determining the address of root node PE1 50, egress PE5 58 and egress PE6 60 each originate a BGP Leaf auto-discovery route, which is advertised to egress ABR4 46. Additionally, egress PE7 62 originates a BGP Leaf auto-discovery route, which is advertised to egress ABR5 48.

When each of egress ABR3 44, ABR4 46, and ABR5 48 receives a BGP Leaf auto-discovery route, then the egress ABR originates a BGP Leaf auto-discovery route toward root node PE1 50. The egress ABRs then advertise the BGP Leaf auto-discovery routes to the ingress ABRs of inter-area P2MP segmented LSP 31, e.g., ingress ABR1 40 and ingress ABR2 42. For example, upon receiving BGP Leaf auto-discovery routes from egress PE3 54 and egress PE4 56 and determining the address of root node PE1 50, egress ABR3 44 originates a BGP Leaf auto-discovery route, which is advertised to ingress ABR1 40. In another example, upon receiving BGP Leaf auto-discovery routes from egress PE5 58 and egress PE6 60 and determining the address of root node PE1 50, egress ABR4 46 originates a BGP Leaf auto-discovery route, which is advertised to ingress ABR2 42. Additionally, upon receiving BGP Leaf auto-discovery routes from egress PE7 62 and determining the address of root node PE1 50, egress ABR5 48 originates a BGP Leaf auto-discovery route, which is advertised to ingress ABR2 42.

Each of egress ABR3 44, ABR4 46, and ABR5 48 may then build intra-area LSPs within egress routing areas 36 and 38 to carry egress area segments 70, 72, and 74 of inter-area P2MP segmented LSP 31. The routers within egress areas 36 and 38 may independently select one of the multicast MPLS protocols, e.g., mLDP or RSVP-TE, as its intra-area label distribution protocol. For example, egress ABR3 44 may use one of RSVP-TE and mLDP to construct an inter-area P2MP LSP within egress routing area 36 to carry egress area segment 70 of inter-area P2MP segmented LSP 31. As another example, egress ABR4 46 and egress ABR5 58 may use one of RSVP-TE and mLDP to construct intra-area LSPs within egress area 38 to respectively carry egress area segment 72 and egress area segment 74 of inter-area P2MP segmented LSP 31.

In some examples, egress ABR3 44, ABR4 46, and ABR5 48 may bind the intra-area LSPs to inter-area P2MP segmented LSP 31 within egress routing areas 36 and 38. More specifically, egress ABR3 33 may advertise the binding using a BGP PMSI auto-discovery route for inter-area P2MP segmented LSP 31 that includes an identity of the intra-area LSP and an upstream-assigned MPLS label of egress area segment 70 within egress routing area 36. In addition, egress ABR4 46 may advertise the binding using a BGP PMSI auto-discovery route for inter-area P2MP segmented LSP 31 that includes an identity of the intra-area LSP and an upstream-assigned MPLS label of egress area segment 72 within egress routing area 38. Egress ABR5 48 may also advertise the binding using a BGP PMSI auto-discovery route for inter-area P2MP segmented LSP 31 that includes an identity of the intra-area LSP and an upstream-assigned MPLS label of egress area segment 74 within egress routing area 38. In the case where the service carried by inter-area P2MP segmented LSP 31 is IP multicast, egress ABR3 44, ABR4 46, and ABR5 48 may not bind the intra-area LSPs to inter-area P2MP segmented LSP 31, and leaf nodes PE3 54, PE4 56, PE5 58, PE6 60, and PE7 62 may forward multicast traffic using IP multicast forwarding information stored in the leaf nodes.

In the example of FIG. 2, the egress area LSP segments 70, 72, and 74 comprise separate intra-area LSPs used solely to carry an egress area segment of inter-area P2MP segmented LSP 31. In that case, the MPLS label of the egress area segment in the BGP PMSI auto-discovery route for the binding is set to null. In other examples, each of egress area segments 70, 72, and 74 may be nested in an intra-area aggregate LSP with one or more other egress segments of different inter-area P2MP segmented LSPs. In that case, the MPLS label of the egress area segment is included in a label stack of the BGP PMSI auto-discovery route for the binding.

When each of ingress ABR1 40 and ingress ABR2 42 receives a BGP Leaf auto-discovery route, the ingress ABR originates a BGP Leaf auto-discovery route toward root node PE1 50. The ingress ABRs then advertise the BGP Leaf auto-discovery routes to the next-hop root node PE1 50 of inter-area P2MP segmented LSP 31. For example, upon receiving BGP Leaf auto-discovery routes from egress ABR3 and determining the address of root node PE1 50, ingress ABR1 40 originates a BGP Leaf auto-discovery route, which is advertised to root node PE1 50. In another example, upon receiving BGP Leaf auto-discovery routes from egress ABR4 46 and egress ABR5 48 and determining the address of root node PE1 50, ingress ABR2 42 originates a BGP Leaf auto-discovery route, which is advertised to root node PE1 50. Additionally, upon determining the address of root node PE1 50, ingress PE2 52 originates a BGP Leaf auto-discovery route, which is advertised to root node PE1 50.

Each of ingress ABR1 40 and ingress ABR2 42 may then build intra-area LSPs within backbone routing area 34 to carry backbone area LSP segments 66 and 68 of inter-area P2MP segmented LSP 31. For example, ingress ABR1 40 and ingress ABR2 42 may use one of RSVP-TE and mLDP to construct intra-area LSPs within backbone routing area 34 to respectively carry backbone area segment 66 and backbone area segment 68 of inter-area P2MP segmented LSP 31.

In some examples, ingress ABR1 40 and ingress ABR2 42 may bind the intra-area LSPs to inter-area P2MP segmented LSP 31 within backbone routing area 34. More specifically, ingress ABR1 40 may advertise the binding using a BGP PMSI auto-discovery route for inter-area P2MP segmented LSP 31 that includes an identity of the intra-area LSP and an upstream-assigned MPLS label of backbone area segment 66 within backbone routing area 34. In addition, ingress ABR2 42 may advertise the binding using a BGP PMSI auto-discovery route for inter-area P2MP segmented LSP 31 that includes an identity of the intra-area LSP and an upstream-assigned MPLS label of backbone area segment 68 within backbone routing area 34.

In the example of FIG. 2, the backbone area LSP segments 66 and 68 comprise separate intra-area LSPs used solely to carry a backbone area segment of inter-area P2MP segmented LSP 31. In that case, the MPLS label of the backbone area segment in the BGP PMSI auto-discovery route for the binding is set to null. In other examples, each of backbone area segments 66 and 68 may be nested in an intra-area aggregate LSP with one or more other backbone area segments of different inter-area P2MP segmented LSPs. In that case, the MPLS label of the backbone area segment is included in a label stack of the BGP PMSI auto-discovery route for the binding.

Upon receiving the BGP PMSI auto-discovery routes for the binding from ingress ABR1 40 and ingress ABR2 42, egress ABR3 44, ABR4 46, and ABR5 48 may stitch together the backbone area segments and the egress area segments to establish at least a portion of inter-area P2MP segmented LSP 31. For example, egress ABR3 44 may stitch backbone area segment 66 to egress area segment 70 by associating a leaf node of the intra-area LSP that carries backbone area segment 66 with a root node of the intra-area LSP that carries egress area segment 70, which both occur at egress ABR3 44. As another example, egress ABR4 46 may stitch backbone area segment 68 to egress area segment 72 by associating a leaf node of the intra-area LSP that carries backbone area segment 68 with a root node of the intra-area LSP that carries egress area segment 72, which both occur at egress ABR4 46. In addition, egress ABR5 48 may stitch backbone area segment 68 to egress area segment 74 by associating a leaf node of the intra-area LSP that carries backbone area segment 68 with a root node of the intra-area LSP that carries egress area segment 74, which both occur at egress ABR5 48. In some cases, each of egress ABR3 44, ABR4 46, and ABR5 48 may set the BGP next hop of inter-area P2MP segmented LSP 31 to itself. In this way, each of egress ABR3 44, ABR4 46, and ABR5 48 may receive traffic as a leaf node of the intra-area LSP within backbone routing area 34 and send the traffic to itself to be pushed into the intra-area LSP within egress routing area 36 or 38 for which it acts as the root node.

When root node PE1 50 of inter-area P2MP segmented LSP 31 receives a BGP Leaf auto-discovery route, then root node PE1 50 may build intra-area LSPs within ingress routing area 32 to carry ingress area LSP segment 64 of inter-area P2MP segmented LSP 31. For example, root node PE1 50 may use one of RSVP-TE and mLDP to construct an intra-area LSP within ingress routing area 32 to carry ingress area segment 64 of inter-area P2MP segmented LSP 31. In some examples, root node PE1 50 may bind the intra-area LSP to inter-area P2MP segmented LSP 31 within ingress routing area 32. More specifically, root node PE1 50 may advertise the binding using a BGP PMSI auto-discovery route for inter-area P2MP segmented LSP 31 that includes an identity of the intra-area LSP and an upstream-assigned MPLS label of ingress area segment 64 within ingress routing area 32.

In the example of FIG. 2, ingress area LSP segment 64 comprises a separate intra-area LSP used solely to carry ingress area segment 64 of inter-area P2MP segmented LSP 31. In that case, the MPLS label of ingress area segment 64 in the BGP PMSI auto-discovery route for the binding is set to null. In other examples, ingress area segment 64 may be nested in an intra-area aggregate LSP with one or more other ingress area segments of different inter-area P2MP segmented LSPs. In that case, the MPLS label of ingress area segment 64 is included in a label stack of the BGP PMSI auto-discovery route for the binding.

Upon receiving the BGP PMSI auto-discovery routes for the binding from root node PE1 50, ingress ABR1 40 and ingress ABR2 42 may stitch together ingress area segment 64 and the backbone area segments 66 and 68 to establish at least a portion of inter-area P2MP segmented LSP 31. For example, ingress ABR1 40 may stitch ingress area segment 64 to backbone area segment 66 by associating a leaf node of the intra-area LSP that carries ingress area segment 64 with a root node of the intra-area LSP that carries backbone area segment 66, which both occur at ingress ABR1 40. As another example, ingress ABR2 42 may stitch ingress area segment 64 to backbone area segment 68 by associating a leaf node of the intra-area LSP that carries ingress area segment 64 with a root node of the intra-area LSP that carries backbone area segment 68, which both occur at ingress ABR2 42. In some cases, each of ingress ABR1 40 and ABR2 42 may set the BGP next hop of inter-area P2MP segmented LSP 31 to itself. In this way, each of ingress ABR1 40 and ABR2 42 may receive traffic as a leaf node of the intra-area LSP within ingress routing area 32 and send the traffic to itself to be pushed into the intra-area LSP within egress routing area 36 or 38 for which it acts as the root node.

Figure 3:
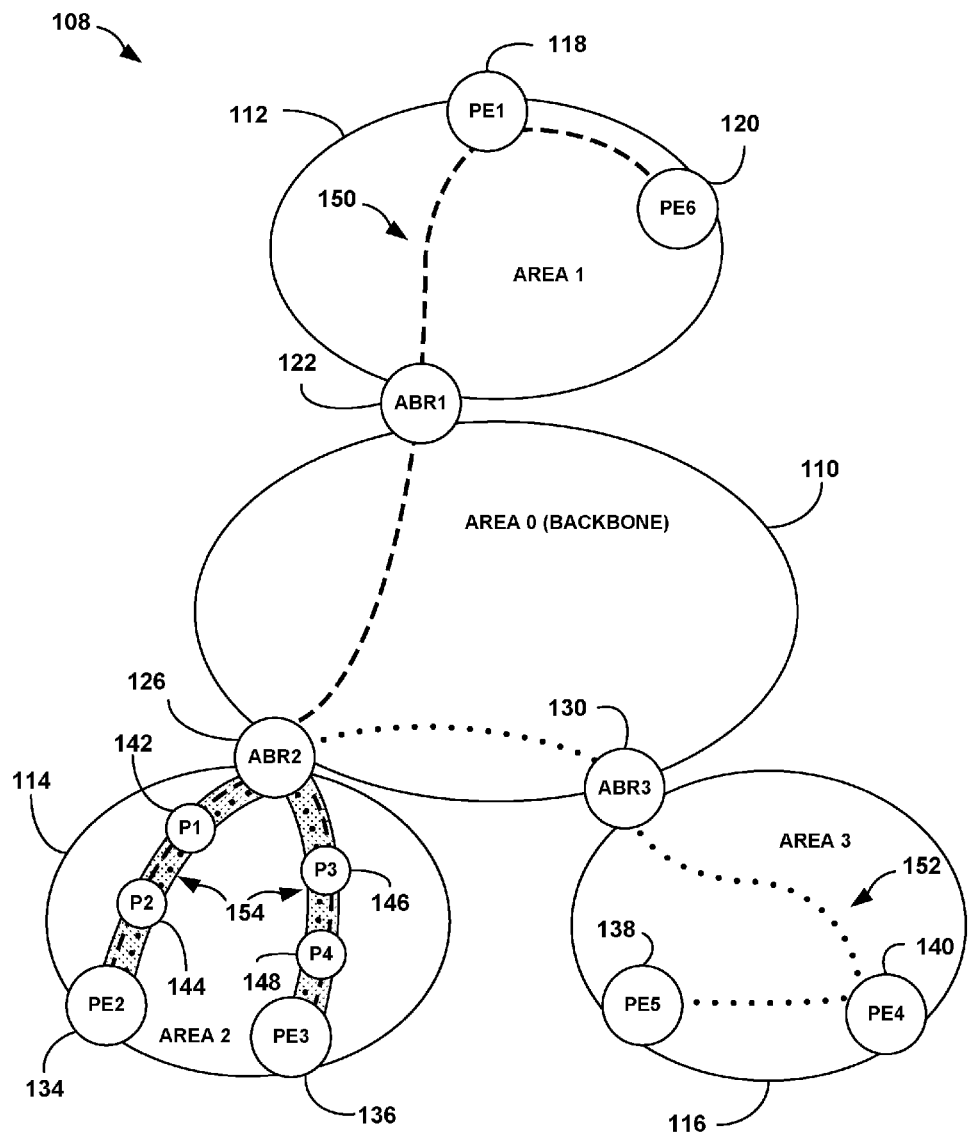
FIG. 3 is a block diagram illustrating P2MP LSP hierarchy with segmentation to aggregate egress area segments of two inter-area P2MP segmented LSPs.

FIG. 3 is a block diagram illustrating P2MP LSP hierarchy with segmentation to aggregate egress area segments of inter-area P2MP segmented LSPs 150 and 152. First inter-area P2MP segmented LSP 150 (represented as a dashed line) and second inter-area P2MP segmented LSP 152 (represented as a dotted line) extend across multiple routing areas 110, 112, 114, and 116 within the same AS 108. In some examples, AS 108 may comprise all or a portion of public network 10 from FIG. 1. AS 108 is logically divided into multiple routing areas 110, 112, 114, and 116, which may be included in a seamless MPLS architecture that exists near the metro edge of public network 10. In accordance with the techniques described herein, inter-area P2MP segmented LSPs 150 and 152 are built by stitching together intra-area LSP segments within each of the routing areas 110, 112, 114 and 116 to provide the PE routers within the routing areas with P2MP connectivity to receive multicast communication.

In the example illustrated in FIG. 3, the ingress and backbone area segments of inter-area P2MP segmented LSP 150 and inter-area P2MP segmented LSP 152 comprise separate intra-area LSPs used solely for inter-area P2MP segmented LSP 150 or 152. The egress area segments of both inter-area P2MP segmented LSP 150 and inter-area P2MP segmented LSP 152 are nested within an intra-area aggregate LSP 154 (represented with shading).

AS 108 includes a first ingress area 112 (i.e., Area 1), a backbone area 110 (i.e., Area 0), and an egress area 114 (i.e., Area 2) of inter-area P2MP segmented LSP 150, and a second ingress area 116 (i.e., Area 3), backbone area 110, and egress area 114 of inter-area P2MP segmented LSP 152. First ingress area 112 includes ingress PE1 118, ingress PE6 120, and ingress ABR1 122. Ingress PE1 118 is the root node of inter-area P2MP segmented LSP 150. Second ingress area 116 includes ingress PE4 140, ingress PE5 138, and ingress ABR3 130. Ingress PE4 140 is the root node of inter-area P2MP segmented LSP 152. Egress area 114 includes egress PE2 134, egress PE3 136, and egress ABR2 126. Egress PE2 134 and egress PE3 136 are leaf nodes of inter-area P2MP segmented LSP 150 and inter-area P2MP segmented LSP 152. In addition, egress area 114 includes provider (P) routers P1 142, P2 144, P3 146, and P4 148 over which intra-area aggregate LSP 154 is built. Egress area 114 includes egress area segments of both inter-area P2MP segmented LSPs 150 and 152, which are nested within intra-area aggregate LSP 154 with egress ABR3 126 as its root node and egress PE2 134 and egress PE3 136 as its leaf nodes.

Focusing on egress routing area 114, once egress PE2 124 and egress PE3 136 discover the P2MP FECs of both inter-area P2MP segmented LSPs 150 and 152, each of the egress PE2 134 and egress PE3 136 originates BGP Leaf auto-discovery routes of both inter-area P2MP segmented LSPs 150 and 152 to egress ABR2 126. When egress ABR2 126 receives the BGP Leaf auto-discovery routes, egress ABR2 126 may build intra-area aggregate LSP 154 within egress routing area 114 to carry the egress area segments of both inter-area P2MP segmented LSPs 150 and 152. Egress ABR2 126 may use either RSVP-TE or mLDP as the intra-area label distribution protocol within egress routing area 114.

Egress ABR2 126 may bind intra-area aggregate LSP 154 to inter-area P2MP segmented LSPs 150 and 152 within egress routing area 114. More specifically, egress ABR2 126 may advertise the binding for inter-area P2MP segmented LSP 150 using a BGP PMSI auto-discovery route that includes an identity of intra-area aggregate LSP 154 and an upstream-assigned MPLS label of the egress area segment of inter-area P2MP segmented LSP 150. Egress ABR2 126 may also advertise the binding for inter-area P2MP segmented LSP 152 using a BGP PMSI auto-discovery route that includes an identity of intra-area aggregate LSP 154 and an upstream-assigned MPLS label of the egress area segment of inter-area P2MP segmented LSP 152. In examples where the service carried by inter-area P2MP segmented LSPs 150 and 152 is IP multicast, egress ABR2 126 may not bind intra-area aggregate LSP 154 to inter-area P2MP segmented LSPs 150 and 152 within egress routing area 114. In this case, egress PE2 134 and PE3 136 may forward multicast traffic using IP multicast forwarding information stored in the leaf nodes.

Egress ABR2 126 also may stitch each of the egress area segments carried by intra-area aggregate LSP 154 to the respective backbone area segments of inter-area P2MP segmented LSPs 150 and 152. For example, egress ABR2 126 may associate a root node of intra-area aggregate LSP 154 that carries the egress area segment of inter-area P2MP segmented LSP 150 with a leaf node of an intra-area LSP within backbone area 110 that carries the backbone area segment of inter-area P2MP segmented LSP 150. Moreover, egress ABR2 126 may associate a root node of intra-area aggregate LSP 154 that carries the egress area segment of inter-area P2MP segmented LSP 152 with a leaf node of an intra-area LSP within backbone area 110 that carries the backbone area segment of inter-area P2MP segmented LSP 152.

In order to perform this aggregation, egress ABR2 126 needs to know that egress PE2 134 and egress PE3 136 are the leaf nodes of the egress segments of inter-area P2MP segmented LSPs 150 and 152. Egress ABR2 126 discovers the leaf nodes in egress routing area 114 based on the BGP Leaf auto-discovery routes originated by egress PE2 134 and egress PE3 136. Egress ABR2 126 does not need know the leaf nodes of inter-area P2MP segmented LSPs 150 and 152 in the other routing areas. In addition, egress PE2 134 and egress PE3 136 need to know the identity of intra-area aggregate LSP 154 and the upstream-assigned MPLS labels of the egress area segments nested within intra-area aggregate LSP 154. Egress PE2 134 and egress PE3 136 discover the identity of intra-area aggregate LSP 154 and the MPLS labels of the egress area segments carried by intra-area aggregate LSP 154 based on the BGP PMSI auto-discovery routes re-advertised by egress ABR2 126.

As illustrated in FIG. 3, inter-area P2MP segmented LSPs 150 and 152 are not congruent because they do not share a root node. The egress area segments of inter-area P2MP segmented LSPs 150 and 152, however, are fully congruent within egress routing area 114. In accordance with the LSP hierarchy with segmentation techniques, intra-area aggregate LSP 154 may aggregate the congruent egress area segments of inter-area P2MP segmented LSPs 150 and 152 even though inter-area P2MP segmented LSPs 150 and 152 are not even partially congruent. By aggregating in egress routing area 114, P1 142, P2 144, P3 146, and P4 148 maintain state for intra-area aggregate LSP 154, but do not need to maintain state for either inter-area P2MP segmented LSP 150 or inter-area P2MP segmented LSP 152.

Figure 4:
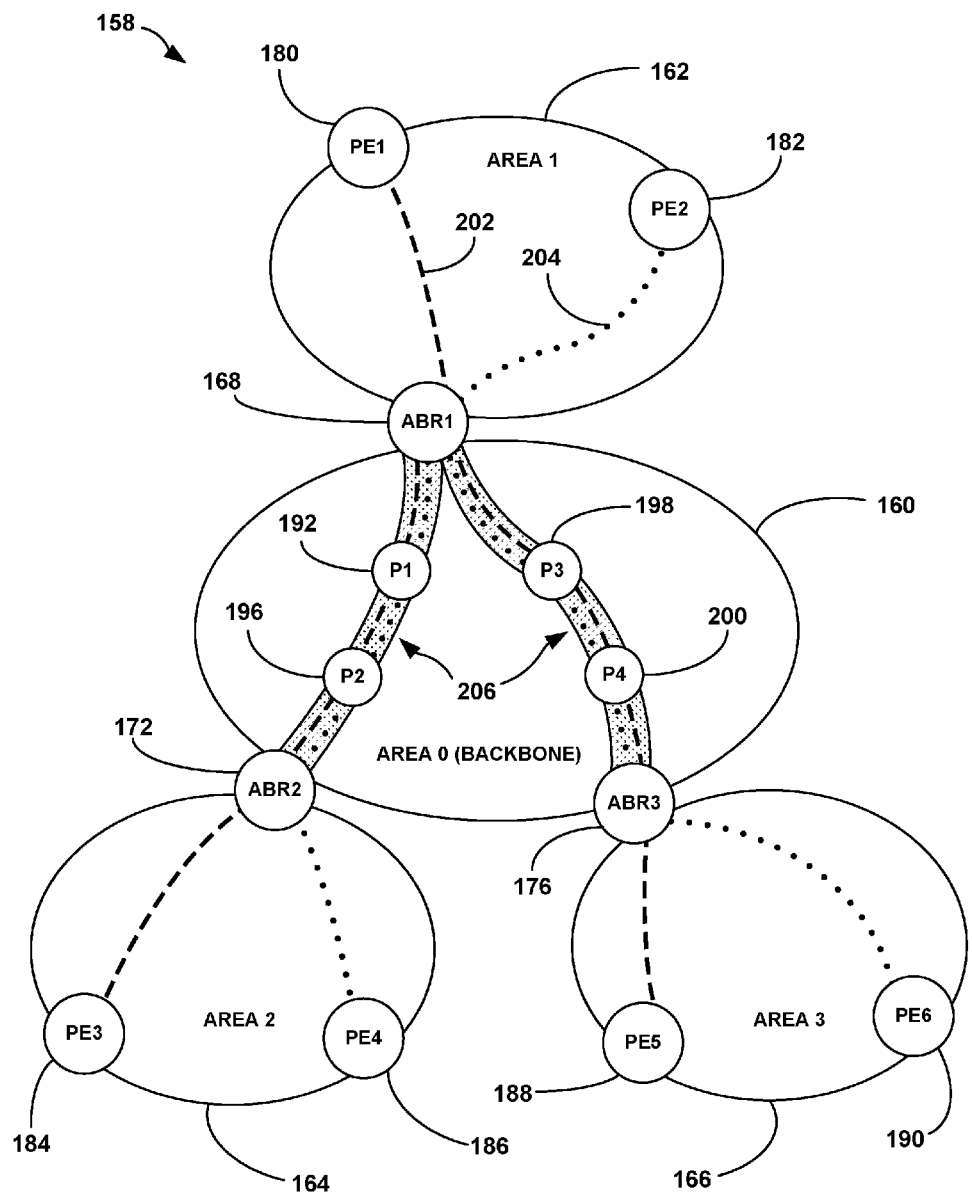
FIG. 4 is a block diagram illustrating P2MP LSP hierarchy with segmentation to aggregate backbone area segments of two inter-area P2MP segmented LSPs.

FIG. 4 is a block diagram illustrating P2MP LSP hierarchy with segmentation to aggregate backbone area segments of inter-area P2MP segmented LSPs 202 and 204. First inter-area P2MP segmented LSP 202 (represented as a dashed line) and second inter-area P2MP segmented LSP 204 (represented as a dotted line) extend across multiple routing areas 160, 162, 164, and 166 within the same AS 158. In some examples, AS 158 may comprise all or a portion of public network 10 from FIG. 1. AS 158 is logically divided into multiple routing areas 160, 162, 164, and 166, which may be included in a seamless MPLS architecture that exists near the metro edge of public network 10. In accordance with the techniques described herein, inter-area P2MP segmented LSPs 202 and 204 are built by stitching together intra-area LSP segments within each of the routing areas 160, 162, 164 and 166 to provide the PE routers within the routing areas with P2MP connectivity to receive multicast communication.

In the example illustrated in FIG. 4, the ingress and egress area segments of inter-area P2MP segmented LSP 202 and inter-area P2MP segmented LSP 204 comprise separate intra-area LSPs used solely for inter-area P2MP segmented LSP 202 or 204. The backbone area segments of both inter-area P2MP segmented LSP 202 and inter-area P2MP segmented LSP 204 are nested within an intra-area aggregate LSP 206 (represented with shading).

AS 158 includes an ingress area 162 (i.e., Area 1), a backbone area 160 (i.e., Area 0), a first egress area 164 (i.e., Area 2), and a second egress area 166 (i.e., Area 3) of inter-area P2MP segmented LSP 202 and inter-area P2MP segmented LSP 204. Ingress area 162 includes ingress PE1 180, ingress PE2 182, and ingress ABR1 168. Ingress PE1 180 is the root node of inter-area P2MP segmented LSP 202, and ingress PE2 182 is the root node of inter-area P2MP segmented LSP 204. First egress area 164 includes egress PE3 184, egress PE4 186, and egress ABR2 172. Second egress area 166 includes egress PE5 188, egress PE6 190, and egress ABR3 176. Egress PE3 184 and egress PE5 188 are leaf nodes of inter-area P2MP segmented LSP 202. Egress PE4 186 and egress PE6 190 are leaf nodes of inter-area P2MP segmented LSP 204. Backbone area 160 includes provider (P) routers P1 192, P2 196, P3 198, and P4 200 over which intra-area aggregate LSP 206 is built. Background area 160 includes background area segments of both inter-area P2MP segmented LSPs 202 and 204, which are nested within intra-area aggregate LSP 206 with ingress ABR1 168 as its root node and egress ABR2 172 and egress ABR3 176 as its leaf nodes.

Focusing on backbone routing area 160, egress ABR2 172 and egress ABR3 176 receive BGP Leaf auto-discovery routes of inter-area P2MP segmented LSP 202 from egress PE3 184 and egress PE5 188, and receive BGP Leaf auto-discovery routes of inter-area P2MP segmented LSP 204 from egress PE4 186 and egress PE6 190. Each of the egress ABR2 172 and egress ABR3 176 then originates BGP Leaf auto-discovery routes of both inter-area P2MP segmented LSPs 202 and 204 to ingress ABR1 168. When ingress ABR1 168 receives the BGP Leaf auto-discovery routes, ingress ABR1 168 may build intra-area aggregate LSP 206 within backbone routing area 160 to carry the backbone area segments of both inter-area P2MP segmented LSPs 202 and 204. Ingress ABR1 168 may use either RSVP-TE or mLDP as the intra-area label distribution protocol within backbone routing area 160.

Ingress ABR1 168 may bind intra-area aggregate LSP 206 to inter-area P2MP segmented LSPs 202 and 204 within backbone routing area 160. More specifically, ingress ABR1 168 may advertise the binding for inter-area P2MP segmented LSP 202 using a BGP PMSI auto-discovery route that includes an identity of intra-area aggregate LSP 206 and an upstream-assigned MPLS label of the backbone area segment of inter-area P2MP segmented LSP 202. Ingress ABR1 168 may also advertise the binding for inter-area P2MP segmented LSP 204 using a BGP PMSI auto-discovery route that includes an identity of intra-area aggregate LSP 206 and an upstream-assigned MPLS label of the backbone area segment of inter-area P2MP segmented LSP 204.

Ingress ABR1 168 also may stitch each of the backbone area segments carried by intra-area aggregate LSP 206 to the respective ingress area segments of inter-area P2MP segmented LSPs 202 and 204. For example, ingress ABR1 168 may associate a root node of intra-area aggregate LSP 206 that carries the backbone area segment of inter-area P2MP segmented LSP 202 with a leaf node of an intra-area LSP within ingress area 162 that carries the ingress area segment of inter-area P2MP segmented LSP 202. Moreover, ingress ABR1 168 may associate a root node of intra-area aggregate LSP 206 that carries the backbone area segment of inter-area P2MP segmented LSP 204 with a leaf node of an intra-area LSP within ingress area 162 that carries the ingress area segment of inter-area P2MP segmented LSP 204. Egress ABR2 172 and egress ABR3 176 may similarly stitch each of the backbone area segments carried by intra-area aggregate LSP 206 to the respective egress area segments of inter-area P2MP segmented LSPs 202 and 204.

In order to perform this aggregation, ingress ABR1 168 needs to know that egress ABR2 172 and egress ABR3 176 are the leaf nodes of the backbone segments of inter-area P2MP segmented LSPs 202 and 204. Ingress ABR1 168 discovers the leaf nodes in backbone routing area 160 based on the BGP Leaf auto-discovery routes originated by egress ABR2 172 and egress ABR3 176. Ingress ABR1 168 does not need know the leaf nodes of inter-area P2MP segmented LSPs 202 and 204 in the other routing areas. In addition, egress ABR2 172 and egress ABR3 176 need to know the identity of intra-area aggregate LSP 206 and the upstream-assigned MPLS labels of the backbone segments nested within intra-area aggregate LSP 206. Egress ABR2 172 and egress ABR3 176 discover the identity of intra-area aggregate LSP 206 and the MPLS labels of the backbone area segments carried by intra-area aggregate LSP 206 based on the BGP PMSI auto-discovery routes re-advertised by ingress ABR1 168.

As illustrated in FIG. 4, inter-area P2MP segmented LSPs 202 and 204 are not congruent because they do not share a root node. The backbone area segments of inter-area P2MP segmented LSPs 202 and 204, however, are fully congruent within backbone routing area 160. In accordance with the LSP hierarchy with segmentation techniques, intra-area aggregate LSP 206 may aggregate the congruent backbone area segments of inter-area P2MP segmented LSPs 202 and 204 even though inter-area P2MP segmented LSPs 202 and 204 are not even partially congruent. By aggregating in backbone routing area 160, P1 192, P2 196, P3 198, and P4 200 maintain state for intra-area aggregate LSP 206, but do not need to maintain state for either inter-area P2MP segmented LSP 202 or inter-area P2MP segmented LSP 204.

Figure 5:
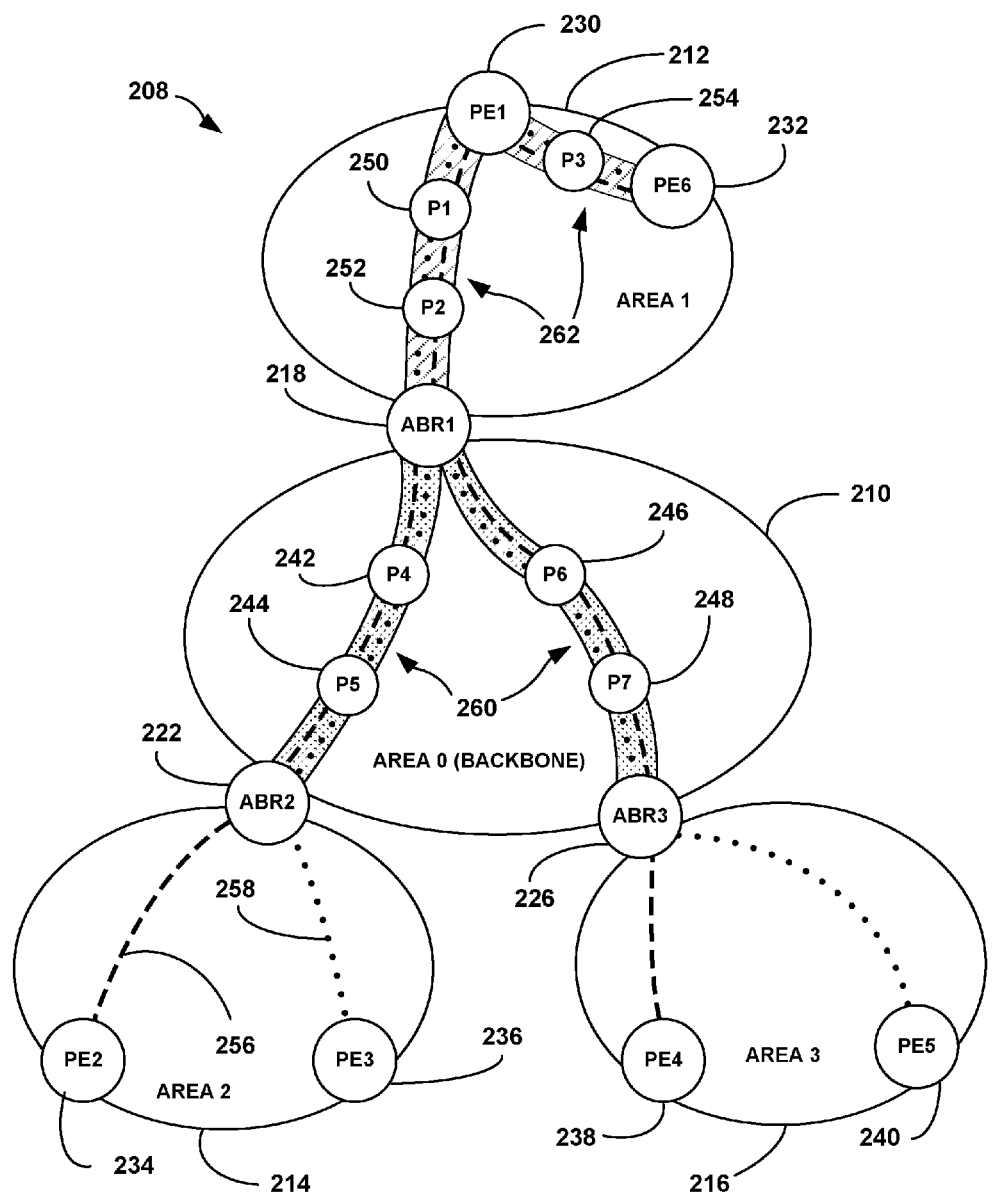
FIG. 5 is a block diagram illustrating P2MP LSP hierarchy with segmentation to aggregate ingress area segments and backbone area segments of two inter-area P2MP segmented LSPs.

FIG. 5 is a block diagram illustrating P2MP LSP hierarchy with segmentation to aggregate ingress area segments and backbone area segments of inter-area P2MP segmented LSPs 256 and 258. First inter-area P2MP segmented LSP 256 (represented as a dashed line) and second inter-area P2MP segmented LSP 258 (represented as a dotted line) extend across multiple routing areas 210, 212, 214, and 216 within the same AS 208. In some examples, AS 208 may comprise all or a portion of public network 10 from FIG. 1. AS 208 is logically divided into multiple routing areas 210, 212, 214, and 216, which may be included in a seamless MPLS architecture that exists near the metro edge of public network 10. In accordance with the techniques described herein, inter-area P2MP segmented LSPs 256 and 258 are built by stitching together intra-area LSP segments within each of the routing areas 210, 212, 214 and 216 to provide the PE routers within the routing areas with P2MP connectivity to receive multicast communication.

In the example illustrated in FIG. 5, the egress area segments of inter-area P2MP segmented LSP 256 and inter-area P2MP segmented LSP 258 comprise separate intra-area LSPs used solely for inter-area P2MP segmented LSP 256 or 258. The ingress area segments of both inter-area P2MP segmented LSP 256 and inter-area P2MP segmented LSP 258 are nested within an intra-area aggregate LSP 262 (represented with shading). The backbone area segments of both inter-area P2MP segmented LSP 256 and inter-area P2MP segmented LSP 258 are nested within an intra-area aggregate LSP 260 (represented with shading).

AS 208 includes an ingress area 212 (i.e., Area 1), a backbone area 210 (i.e., Area 0), a first egress area 214 (i.e., Area 2), and a second egress area 216 (i.e., Area 3) of inter-area P2MP segmented LSP 256 and inter-area P2MP segmented LSP 258. Ingress area 212 includes ingress PE1 230, ingress PE6 232, and ingress ABR1 218. Ingress PE1 230 is the root node of both inter-area P2MP segmented LSP 256 and inter-area P2MP segmented LSP 258. First egress area 214 includes egress PE2 234, egress PE3 236, and egress ABR2 222. Second egress area 216 includes egress PE4 238, egress PE5 240, and egress ABR3 226. Egress PE2 234 and egress PE4 238 are leaf nodes of inter-area P2MP segmented LSP 256. Egress PE3 236 and egress PE5 240 are leaf nodes of inter-area P2MP segmented LSP 258. Ingress area 212 includes P routers P1 250, P2 252, and P3 254 over which intra-area aggregate LSP 262 is built. Backbone area 210 includes P routers P4 242, P5 244, P6 246, and P7 248 over which intra-area aggregate LSP 260 is built.

Ingress area 212 includes ingress area segments of both inter-area P2MP segmented LSPs 256 and 256, which are nested within intra-area aggregate LSP 262 with ingress PE1 230 as its root node and ingress ABR1 218 and ingress PE1 232 as its leaf nodes. Backbone area 160 includes backbone area segments of both inter-area P2MP segmented LSPs 256 and 258, which are nested within intra-area aggregate LSP 260 with ingress ABR1 218 as its root node and egress ABR2 222 and egress ABR3 226 as its leaf nodes.

Focusing on ingress routing area 212, ingress ABR1 218 receives BGP Leaf auto-discovery routes of both inter-area P2MP segmented LSPs 256 and 258 from egress ABR2 222 and egress ABR3 226. Ingress ABR1 218 then originates BGP Leaf auto-discovery routes of both inter-area P2MP segmented LSPs 256 and 258 to ingress PE1 230. Ingress PE6 232 may also originate BGP Leaf auto-discovery routes of both inter-area P2MP segmented LSPs 256 and 258 to ingress PE1 230. When ingress PE1 230 receives the BGP Leaf auto-discovery routes, ingress PE1 230 may build intra-area aggregate LSP 262 within ingress routing area 212 to carry the ingress area segments of both inter-area P2MP segmented LSPs 256 and 258. Ingress PE1 230 may use either RSVP-TE or mLDP as the intra-area label distribution protocol within ingress routing area 212.

Ingress PE1 230 may bind intra-area aggregate LSP 262 to inter-area P2MP segmented LSPs 256 and 258 within ingress routing area 212. More specifically, ingress PE1 230 may advertise the binding for inter-area P2MP segmented LSP 256 using a BGP PMSI auto-discovery route that includes an identity of intra-area aggregate LSP 262 and an upstream-assigned MPLS label of the ingress area segment of inter-area P2MP segmented LSP 256. Ingress PE1 230 may also advertise the binding for inter-area P2MP segmented LSP 258 using a BGP PMSI auto-discovery route that includes an identity of intra-area aggregate LSP 262 and an upstream-assigned MPLS label of the ingress area segment of inter-area P2MP segmented LSP 258.

In order to perform this aggregation, ingress PE1 230 needs to know that ingress ABR1 218 and ingress PE6 232 are the leaf nodes of the ingress segments of inter-area P2MP segmented LSPs 256 and 258. Ingress PE1 230 discovers the leaf nodes in ingress routing area 212 based on the BGP Leaf auto-discovery routes originated by ingress ABR1 218 and ingress PE6 232. Ingress PE1 230 does not need know the leaf nodes of inter-area P2MP segmented LSPs 256 and 258 in the other routing areas. In addition, ingress ABR1 218 and ingress PE6 232 need to know the identity of intra-area aggregate LSP 262 and the upstream-assigned MPLS labels of the ingress segments nested within intra-area aggregate LSP 262. Ingress ABR1 218 and ingress PE6 232 discover the identity of intra-area aggregate LSP 262 and the MPLS labels of the ingress area segments carried by intra-area aggregate LSP 262 based on the BGP PMSI auto-discovery routes re-advertised by ingress PE1 230.

Focusing on backbone routing area 210, egress ABR2 222 and egress ABR3 226 receive BGP Leaf auto-discovery routes of inter-area P2MP segmented LSP 256 from egress PE2 256 and egress PE4 238, and receive BGP Leaf auto-discovery routes of inter-area P2MP segmented LSP 258 from egress PE3 236 and egress PE5 240. Each of egress ABR2 222 and egress ABR3 226 then originates BGP Leaf auto-discovery routes of both inter-area P2MP segmented LSPs 256 and 258 to ingress ABR1 218. When ingress ABR1 218 receives the BGP Leaf auto-discovery routes, ingress ABR1 218 may build intra-area aggregate LSP 260 within backbone routing area 210 to carry the backbone area segments of both inter-area P2MP segmented LSPs 256 and 258. Ingress ABR1 218 may use either RSVP-TE or mLDP as the intra-area label distribution protocol within backbone routing area 210.

Ingress ABR1 218 may bind intra-area aggregate LSP 260 to inter-area P2MP segmented LSPs 256 and 258 within backbone routing area 210. More specifically, ingress ABR1 218 may advertise the binding for inter-area P2MP segmented LSP 256 using a BGP PMSI auto-discovery route that includes an identity of intra-area aggregate LSP 260 and an upstream-assigned MPLS label of the backbone area segment of inter-area P2MP segmented LSP 256. Ingress ABR1 218 may also advertise the binding for inter-area P2MP segmented LSP 258 using a BGP PMSI auto-discovery route that includes an identity of intra-area aggregate LSP 260 and an upstream-assigned MPLS label of the backbone area segment of inter-area P2MP segmented LSP 258.

Ingress ABR1 218 also may stitch each of the backbone area segments carried by intra-area aggregate LSP 260 to the respective ingress area segments carried by intra-area aggregate LSP 262. For example, ingress ABR1 218 may associate a root node of intra-area aggregate LSP 260 that carries the backbone area segment of inter-area P2MP segmented LSP 256 with a leaf node of intra-area aggregate LSP 262 that carries the ingress area segment of inter-area P2MP segmented LSP 256. Moreover, ingress ABR1 218 may associate a root node of intra-area aggregate LSP 260 that carries the backbone area segment of inter-area P2MP segmented LSP 258 with a leaf node of intra-area aggregate LSP 262 that carries the ingress area segment of inter-area P2MP segmented LSP 258. Egress ABR2 222 and egress ABR3 226 may similarly stitch each of the backbone area segments carried by intra-area aggregate LSP 260 to the respective egress area segments of inter-area P2MP segmented LSPs 256 and 258.

In order to perform this aggregation, ingress ABR1 218 needs to know that egress ABR2 222 and egress ABR3 226 are the leaf nodes of the backbone segments of inter-area P2MP segmented LSPs 256 and 258. Ingress ABR1 218 discovers the leaf nodes in backbone routing area 210 based on the BGP Leaf auto-discovery routes originated by egress ABR2 222 and egress ABR3 226. Ingress ABR1 218 does not need know the leaf nodes of inter-area P2MP segmented LSPs 256 and 258 in the other routing areas. In addition, egress ABR2 222 and egress ABR3 226 need to know the identity of intra-area aggregate LSP 260 and the upstream-assigned MPLS labels of the backbone segments nested within intra-area aggregate LSP 260. Egress ABR2 222 and egress ABR3 226 discover the identity of intra-area aggregate LSP 260 and the MPLS labels of the backbone area segments carried by intra-area aggregate LSP 260 based on the BGP PMSI auto-discovery routes re-advertised by ingress ABR1 218.

As illustrated in FIG. 5, inter-area P2MP segmented LSPs 256 and 258 are not congruent because, although they share a root node, they do not share any leaf nodes. The ingress area segments of inter-area P2MP segmented LSPs 256 and 258 are congruent within ingress routing area 212, and the backbone area segments of inter-area P2MP segmented LSPs 256 and 258 are congruent within backbone routing area 210. In accordance with the LSP hierarchy with segmentation techniques, intra-area aggregate LSP 262 may aggregate the congruent ingress area segments of inter-area P2MP segmented LSPs 256 and 258, and intra-area aggregate LSP 260 may aggregate the congruent backbone area segments of inter-area P2MP segmented LSPs 256 and 258 even though inter-area P2MP segmented LSPs 256 and 258 are not even partially congruent. By aggregating in ingress routing area 212, P1 250, P2 252, and P3 254 maintain state for intra-area aggregate LSP 262, but do not need to maintain state for either inter-area P2MP segmented LSP 256 or inter-area P2MP segmented LSP 258. By aggregating in backbone routing area 210, P4 242, P5 244, P6 256, and P7 248 maintain state for intra-area aggregate LSP 260, but do not need to maintain state for either inter-area P2MP segmented LSP 256 or inter-area P2MP segmented LSP 258.

Figure 6:
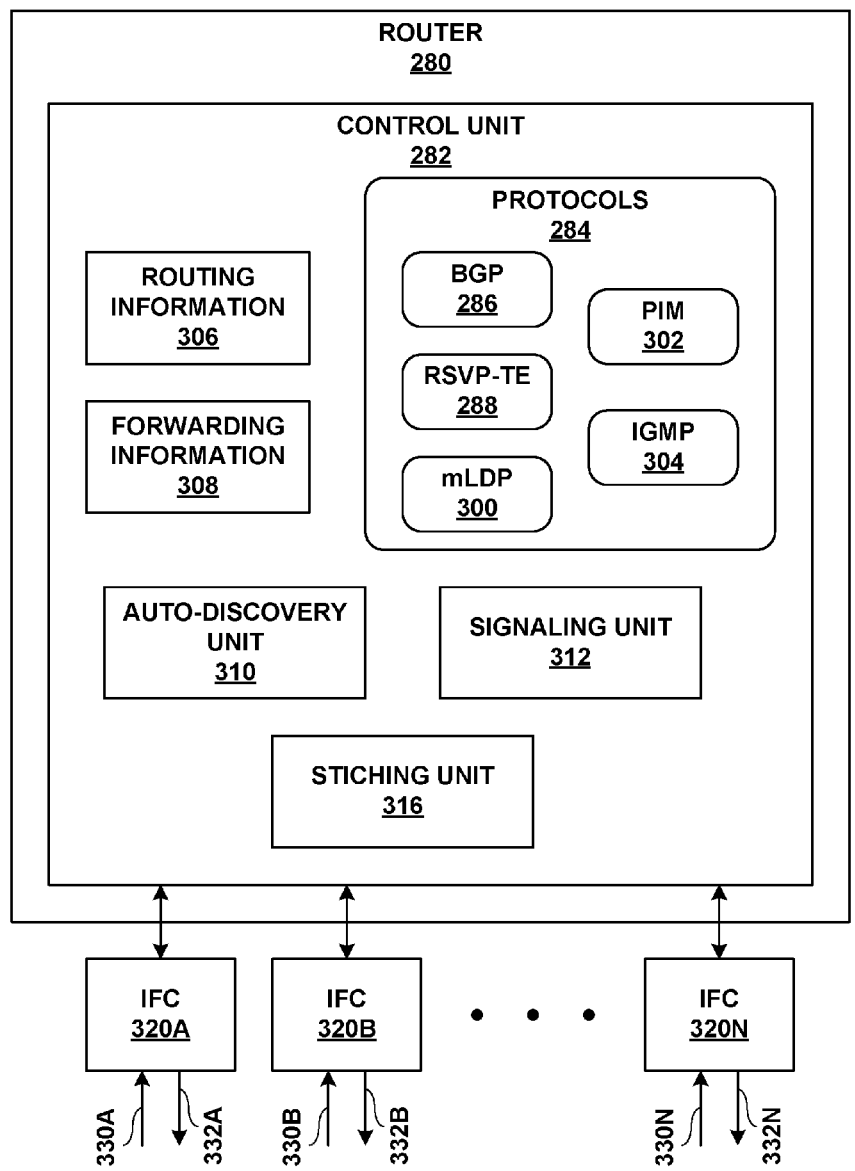

FIG. 6 is a block diagram illustrating an exemplary router 280 capable of establishing an intra-area LSP within a routing area of an AS to carry an intra-area segment of an inter-area P2MP segmented LSP within the AS. Router 280 may comprise any of the ingress PEs, ingress ABRs, egress ABRs, and egress PEs illustrated in FIGS. 1-5. More specifically, router 280 may comprise an ingress PE/root node of the inter-area P2MP segmented LSP that resides within an ingress routing area, or an ingress ABR that resides within an ingress routing area, an egress ABR that resides within an egress routing area, or an egress PE/leaf node of the inter-area P2MP segmented LSP that resides within an egress routing area. Router 280 may be capable of supporting one or more private network instances, including MVPN instances, multicast VPLS instances, and IP multicast instances.

PE router 280 includes interface cards 320A-320N ("IFCs 320") that receive multicast packets via inbound links 330A-330N ("inbound links 330") and send multicast packets via outbound links 332A-332N ("outbound links 332"). IFCs 320 are typically coupled to links 330, 332 via a number of interface ports. Router 280 also includes a control unit 282 that determines routes of received packets and forwards the packets accordingly via IFCs 320. Control unit 282 maintains routing information 306. Routing information 306 describes the topology of a network and, in particular, routes through the network. Routing information 306 may include, for example, route data that describes various routes within the network, and corresponding next hop data indicating appropriate adjacent devices within the network for each of the routes. Router 280 updates routing information 306 to accurately reflect the topology of the network.

Control unit 282 also maintains forwarding information 308 that associates network destinations with specific next hops and corresponding interface ports. In general, when router 280 receives a multicast packet via one of inbound links 330, control unit 282 determines a destination and associated next hop for the packet in accordance with routing information 306 and forwards the packet on one of outbound links 332 to the corresponding next hop in accordance with forwarding information 308 based on the destination of the packet. Control unit 282 provides an operating environment for protocols 284 to execute. In the illustrated embodiment, protocols 284 include BGP 286, RSVP-TE 288, mLDP 300, PIM 302, and IGMP 304. Control unit 282 also includes auto-discovery unit 310, signaling unit 312, and stitching unit 316.

In accordance with the techniques described herein, control unit 282 is also capable of establishing intra-area LSPs within the routing area of an AS in which router 280 resides. The intra-area LSPs carry intra-area segments of an inter-area P2MP segmented LSP, and the intra-area segments may be stitched to other intra-area segments within other routing areas to establish the inter-area P2MP segmented LSP. Each of the private network services, MVPN, multicast VPLS, and IP multicast, that may be supported by router 280 use different signaling procedures to build an intra-area LSP to carry an intra-area segment of an inter-area P2MP segmented LSP. In addition, the building procedures performed by router 280 may be different depending on whether router 280 is an ingress PE router, ingress ABR, egress ABR, or egress PE router. The specific procedures will be described in more detail below.

In general, control unit 282 may discover the identity of the inter-area P2MP segmented LSP based on its P2MP FEC based on communications received on inbound links 330 of IFCs 320. Auto-discovery unit 310 may advertise Leaf auto-discovery routes using BGP 286 within its routing area. Signaling unit 312 may build intra-area LSPs to carry intra-area segments of the inter-area P2MP segmented LSP within its routing area using either RSVP-TE 288 or mLDP 300. In some cases, signaling unit 312 may build an intra-area aggregate LSP within its routing area, and auto-discovery unit 310 may nest two or more intra-area segments of different inter-area P2MP segmented LSPs within the intra-area aggregate LSP. Once the intra-area LSPs are established within the routing area, stitching unit 316 may stitch the intra-area segments carried by the intra-area LSPs to other intra-area segments within other routing areas to form inter-area P2MP segmented LSP 31 using BGP 286. In some cases, auto-discovery unit 310 also advertises a binding of the intra-area LSPs within the routing area to the inter-area P2MP segmented with PMSI auto-discovery routes using BGP 286.

When the service carried on an inter-area P2MP segmented LSP is MVPN or multicast VPLS, router 280 may discover the identity of the inter-area P2MP segmented LSP from the P2MP FEC encoded in the NLRI of a BGP PMSI auto-discovery route originated by a root node of the inter-area P2MP segmented LSP. More specifically, when the service is MVPN, the BGP PMSI auto-discovery route may be an inclusive PMSI (I-PMSI) route or a selective PMSI (S-PMSI) route. When the service is multicast VPLS, the BGP PMSI auto-discovery route may be a VPLS PMSI route or an S-PMSI route.

In addition, the "Leaf Information Required" flag must be set in the Provider Tunnel (P-Tunnel) attribute of the BGP PMSI auto-discovery route. In this way, before any BGP Leaf auto-discovery route is advertised in the same routing area, a BGP PMSI auto-discovery route is advertised either with an explicit tunnel type in the PMSI Tunnel Attribute, if a tunnel identifier has already been assigned, or possibly with a special tunnel type of "no tunnel information present."

In the case where router 280 is the root node, auto-discovery unit 310 may originate the BGP PMSI auto-discovery route with the P2MP FEC of the inter-area P2MP segmented LSP encoded in the NLRI of the route using BGP 286. In the case where router 280 is an ingress or egress ABR, router 280 acts as a route reflector of the BGP PMSI auto-discovery route and re-advertises the route toward the leaf nodes of the inter-area P2MP segmented LSP. In addition, router 280 does not modify a BGP Next Hop with re-advertising the BGP PMSI auto-discovery route. To avoid requiring ABRs of the inter-area P2MP segmented LSP to participate in the propagation of customer multicast (C-multicast) routes, the ABRs may not modify BGP Next Hop when re-advertising the auto-discovery routes. Egress PEs may advertise the C-multicast routes to route reflectors that are different than the ABRs of the inter-area P2MP segmented LSP. The ABRs, however, may still be configured to be the route reflectors for C-multicast routes, in which case they will participate in the propagation of C-multicast routes. In the case where router 280 is a leaf node, auto-discovery unit 310 receives the BGP PMSI auto-discovery route and discovers the identity of the inter-area P2MP segmented LSP based on the P2MP FEC encoded in the NLRI of the route.

When the service carried on an inter-area P2MP segmented LSP is IP multicast, router 280 may discover the identity of the inter-area P2MP segmented LSP from the P2MP FEC formed by source-group (S/*, G) entries of a received multicast stream. In the case where IFCs 320 comprise IP multicast interfaces, IFCs 320 receive IGMP 304 or PIM 302 messages that include the source-group entries of multicast streams. Auto-discovery unit 310 may discover the P2MP FEC from the received source-group entries. Each (S/*, G) entry may have a distinct inter-area P2MP segmented LSP. In the case where router 280 is an ingress or egress ABR, router 280 maintains forwarding information 306 for the inter-area P2MP segmented LSP and every other (S, G) tree traversing router 280. For a given (S, G) entry, both the root node and ingress ABRs have to allocate a distinct upstream-assigned label for the corresponding inter-area P2MP segmented LSP.

For the following description, router 280 is assumed to be an egress PE/leaf node of the inter-area P2MP segmented LSP. Once egress router 280 discovers the P2MP FEC of the inter-area P2MP segmented LSP, egress router 280 originates Leaf auto-discovery routes toward the root node using BGP 286 to initiate the building of the inter-area P2MP segmented LSP. Auto-discovery unit 310 of egress router 280 first determines the address of the root node of the inter-area P2MP segmented LSP identified by the P2MP FEC. For example, when the service is MVPN or multicast VPLS, the address of the root node is included as the BGP next-hop of the MVPN or VPLS auto-discovery route from which auto-discovery unit 310 discovered the P2MP FEC.

As another example, when the service is IP multicast, the address of the root node is set in the Local Administrator field of the VRF Route Import Extended Community of the unicast or multicast route to the root node/rendezvous point (RP). More specifically, the unicast routes to multicast sources/RPs may carry the Virtual Routing and Forwarding (VRF) Route Import Extended Community where the IP address in the Global Administrator field is set to the IP address of the root node and the Local Administrator field of this community is set to 0. If it is not desirable to advertise the VRF Route Import Extended Community in unicast routes, then unicast routes to multicast sources/RPs are advertised using the multicast subsequent address family identifier (SAFI), i.e. SAFI 2, and the VRF Route Import Extended Community is carried in the SAFI 2 routes.

After determining the address of the root node, auto-discovery unit 310 uses BGP 286 to originate the Leaf auto-discovery routes toward the root node. If the P2MP FEC was discovered from a MVPN or VPLS auto-discovery route then auto-discovery unit 310 originates a BGP Leaf auto-discovery route if the MVPN or VPLS auto-discovery route carries a P-Tunnel Attribute with the "Leaf Information Required" flag set. If the P2MP FEC was discovered from an IP Multicast (S/*, G) entry and the address of the root node is not the same as the address of egress router 280, then auto-discovery unit 310 originates a BGP Leaf auto-discovery route. In either case, the Root Key field of the BGP Leaf auto-discovery route carries NLRI with an Originating Router IP Address field set to the address of egress router 280 that originated the route. The Next Hop field of the Multiprotocol Reachable NLRI (MP_REACH_NLRI) attribute of the BGP Leaf auto-discovery route is set to the same address as the Originating Router IP Address field in the NLRI of the BGP Leaf auto-discovery route.

To constrain distribution of the BGP Leaf auto-discovery routes, auto-discovery unit 310 constructs an IP-based Route Target Extended Community with the Global Administrator field set to the IP address of the egress ABR to which the route is advertised, and with the Local Administrator field set to 0. Auto-discovery unit 310 then adds the Route Target Extended Community to the BGP Leaf auto-discovery route. The address of the egress ABR is the BGP next-hop of the BGP route toward the root node of the inter-area P2MP segmented LSP. Auto-discovery unit 310 then advertises the BGP Leaf auto-discovery routes to the next-hop egress ABRs of the inter-area P2MP segmented LSP, which act as route reflectors for auto-discovery routes.

For the following description, router 280 is assumed to be an egress ABR of the inter-area P2MP segmented LSP. When egress ABR 280 receives a BGP Leaf auto-discovery route, or a withdraw of a previously received BGP Leaf auto-discovery route, and the Route Target Extended Community carried by the route contains the IP address of egress ABR 280, then auto-discovery unit 310 originates a BGP Leaf auto-discovery route toward the root node. The BGP Leaf auto-discovery route originated by egress ABR 280 has the same Root Key field as the BGP Leaf auto-discovery routes received from the egress PEs, as described above. The Originating Router IP Address field of the NLRI is set to the address of egress ABR 280 that originated the route. The Next Hop field of the MP_REACH_NLRI attribute of the BGP Leaf auto-discovery route is set to the same address as the Originating Router IP Address field in the NLRI of the BGP Leaf auto-discovery route.

To constrain distribution of the BGP Leaf auto-discovery routes, auto-discovery unit 310 constructs an IP-based Route Target Extended Community with the Global Administrator field set to the IP address of the ingress ABR to which the route is advertised, and with the Local Administrator field set to 0. Auto-discovery unit 310 then adds the Route Target Extended Community to the BGP Leaf auto-discovery route. The address of the ingress ABR is the BGP next-hop of the BGP route toward the root node of the inter-area P2MP segmented LSP.

If the Route Distinguisher (RD) field of the NLRI of the received BGP Leaf auto-discovery route is 0, as is the case when the service is IP multicast, then the address of the root node is determined from the received BGP Leaf auto-discovery route. If the RD field of the NLRI of the received BGP Leaf auto-discovery route is not 0, as is the case when the service is MVPN or multicast VPLS, auto-discovery unit 310 finds an MVPN I-PMSI/S-PMSI auto-discovery route or a VPLS/S-PMSI auto-discovery route whose NLRI has the same value as the Route Key field of the BGP Leaf auto-discovery route, and the BGP next-hop of that NLRI is set to the address of the root node. Auto-discovery unit 310 then advertises the BGP Leaf auto-discovery routes to the next-hop ingress ABRs of the inter-area P2MP segmented LSP, which act as route reflectors for auto-discovery routes.

Signaling unit 312 of egress ABR 280 may then establish an intra-area LSP to carry an egress area LSP segment of the inter-area P2MP segmented LSP with egress ABR 280 as the root node and one or more leaf nodes of the inter-area P2MP segmented LSP as its leaf nodes. Egress ABR 280 and the other routers within the egress routing area may independently select one of RSVP-TE 288 or mLDP 300 as the intra-area label distribution protocol for the egress routing area. Signaling unit 312 may either graft a leaf node specified in the received BGP Leaf auto-discovery route into an existing intra-area LSP rooted at egress ABR 280, or originate a new intra-area LSP within the egress routing area. In some examples, signaling unit 312 may build an intra-area LSP solely used to carry an intra-area segment of one inter-area P2MP segmented LSP. In other examples, signaling unit 312 may build an intra-area aggregate LSP used to carry two more intra-area segments of different inter-area P2MP segmented LSPs. Auto-discovery unit 310 may nest the intra-area segments within the intra-area aggregate LSP by aggregating the forwarding state of the different inter-area P2MP segmented LSPs.

When the RD of the received BGP Leaf auto-discovery route is not zero, which is the case when the service is MVPN or multicast VPLS, then auto-discovery unit 310 of egress ABR 280 binds the intra-area LSP in the egress routing area to the inter-area P2MP segmented LSP. Auto-discovery unit 310 performs the binding by re-advertising in the egress routing area the BGP PMSI auto-discovery route that matches the BGP Leaf auto-discovery route. Auto-discovery unit 310 may, however, only advertise the binding if such a binding has not already been advertised or the binding has changed. The PMSI Tunnel attribute of the re-advertised BGP PMSI route specifies an identity of the intra-area LSP within the egress routing area and carries an upstream assigned MPLS label of the intra-area segment carried by the intra-area LSP. If the intra-area LSP is used solely to carry an intra-area segment of one inter-area P2MP segmented LSP, the upstream-assigned MPLS label is set to an implicit null. If the intra-area LSP is used to carry two or more intra-area segments of different inter-area P2MP segmented LSPs, the upstream-assigned MPLS labels are included in label stacks of the BGP PMSI auto-discovery routes for the respective inter-area P2MP segmented LSPs.

In the case where signaling unit 312 uses RSVP-TE 288 as the intra-area label distribution protocol in the egress routing area, and the RD of the received BGP Leaf auto-discovery route is zero, which is the case when the service is IP multicast, then auto-discovery unit 310 of egress ABR 280 may not advertise any binding. In this case, the egress PEs that are leaf nodes of the inter-area P2MP segmented LSP do not require the binding of the intra-area LSP to the inter-area P2MP segmented LSP. Instead, when the leaf nodes receive multicast packets over the intra-area LSP with no MPLS label in the stack to identify the inter-area P2MP segmented LSP, the leaf nodes forward the multicast packets using IP multicast forwarding information 308.

If the intra-area LSP is used to carry two or more intra-area segments of different inter-area P2MP segmented LSPs, control unit 282 needs to be configured to determine whether a given multicast packet for a particular (S, G) is received from an expected upstream ingress PE router or ingress ABR. The expected router is the router to which auto-discovery unit 310 of egress ABR 280 sent the BGP Leaf auto-discovery route. Control unit 282 will drop any multicast packets received from an unexpected router for that (S, G). To allow the leaf nodes of the inter-area P2MP segmented LSP to determine the sender, the intra-area LSP in the egress area must be signaled with no penultimate hop popping (PHP).

In the case where signaling unit 312 uses mLDP 300 as the intra-area label distribution protocol in the egress routing area, and the RD of the received BGP Leaf auto-discovery route is zero, which is the case when the service is IP multicast, then auto-discovery unit 310 of egress ABR 280 may originate a BGP S-PMSI auto-discovery route within the egress routing area. The PMSI Tunnel attribute of the BGP PMSI auto-discovery route specifies an identity of the intra-area LSP within the egress routing area, but does not carry an upstream assigned MPLS label of the intra-area segment carried by the intra-area LSP. The NLRI of the BGP S-PMSI auto-discovery route includes the same RD and (S, G) entity information as the NLRI of the matching BGP Leaf auto-discovery route. Auto-discovery unit 310 of egress ABR 280 advertises the BGP S-PMSI auto-discovery route to the leaf nodes within the egress routing area. In this case, when the leaf nodes receive multicast packets over the intra-area LSP with no MPLS label in the stack to identify the inter-area P2MP segmented LSP, the leaf nodes forward the multicast packets using IP multicast forwarding information 308. The additional forwarding considerations, including the determination of whether packets are received from an expected sender, are the same as described above with respect to RSVP-TE.

The leaf nodes within the egress routing area join the intra-area LSP identified in the PMSI Tunnel attribute of the BGP PMSI auto-discovery route that advertises the binding of the intra-area LSP to the inter-area P2MP segmented LSP. In addition, the SESSION object that egress ABR 280 may use for the intra-area LSP may not encode the P2MP FEC of the inter-area P2MP segmented LSP discovered from the received BGP Leaf auto-discovery routes.

A single inter-area P2MP segmented LSP may be assumed to carry only a single source-group (S, G) entity. When two or more intra-area segments of multiple inter-area P2MP segmented LSPs are carried over an intra-area aggregate LSP, each of the intra-area segments require a distinct upstream-assigned MPLS label. Distinct MPLS labels may be necessary even if the different inter-area P2MP segmented LSPs carry the same (S, G) entity for the same private network instance. Egress ABR 280, therefore, maintains forwarding information 308 for each of the (S, G) entities carried over the different inter-area P2MP segmented LSPs.

For the following description, router 280 is assumed to be an ingress ABR of the inter-area P2MP segmented LSP. When ingress ABR 280 receives a BGP Leaf auto-discovery route, or a withdraw of a previously received BGP Leaf auto-discovery route, and the Route Target Extended Community carried by the route contains the IP address of ingress ABR 280, then auto-discovery route 310 originates a BGP Leaf auto-discovery route toward the root node. The BGP Leaf auto-discovery route originated by auto-discovery unit 310 has the same Root Key field as the BGP Leaf auto-discovery routes received from the egress ABRs, as described above. The Originating Router IP Address field of the NLRI is set to the address of ingress ABR 280 that originated the route. The Next Hop field of the MP_REACH_NLRI attribute of the BGP Leaf auto-discovery route is set to the same address as the Originating Router IP Address field in the NLRI of the BGP Leaf auto-discovery route.

To constrain distribution of the BGP Leaf auto-discovery routes, auto-discovery unit 310 constructs an IP-based Route Target Extended Community with the Global Administrator field set to the IP address of the root node to which the route is advertised, and with the Local Administrator field set to 0. Auto-discovery unit 310 then adds the Route Target Extended Community to the BGP Leaf auto-discovery route. The address of the root node is the BGP next-hop of the BGP route toward the root node of the inter-area P2MP segmented LSP.

If the RD field of the NLRI of the received BGP Leaf auto-discovery route is 0, as is the case when the service is IP multicast, then the address of the root node is determined from the received BGP Leaf auto-discovery route. If the RD field of the NLRI of the received BGP Leaf auto-discovery route is not 0, as is the case when the service is MVPN or multicast VPLS, auto-discovery unit 310 finds an MVPN I-PMSI/S-PMSI auto-discovery route or a VPLS/S-PMSI auto-discovery route whose NLRI has the same value as the Route Key field of the BGP Leaf auto-discovery route, and the BGP next-hop of that NLRI is set to the address of the root node. Auto-discovery unit 310 of ingress ABR 280 then advertises the BGP Leaf auto-discovery routes to the next-hop root node of the inter-area P2MP segmented LSP.

Signaling unit 312 of ingress ABR 280 may then establish an intra-area LSP to carry a backbone area LSP segment of the inter-area P2MP segmented LSP with ingress ABR 280 as the root node and one or more egress ABRs as its leaf nodes.

Ingress ABR 280 and the other routers adjacent the backbone routing area may independently select one of RSVP-TE 288 or mLDP 300 as the intra-area label distribution protocol for the backbone routing area. Signaling unit 312 may either graft a leaf node specified in the received BGP Leaf auto-discovery route into an existing intra-area LSP rooted at ingress ABR 280, or originate a new intra-area LSP within the backbone routing area. In some examples, signaling unit 312 may build an intra-area LSP solely used to carry an intra-area segment of one inter-area P2MP segmented LSP. In other examples, signaling unit 312 may build an intra-area aggregate LSP used to carry two more intra-area segments of different inter-area P2MP segmented LSPs. Auto-discovery unit 310 may nest the intra-area segments within the intra-area aggregate LSP by aggregating the forwarding state of the different inter-area P2MP segmented LSPs.

When the RD of the received BGP Leaf auto-discovery route is not zero, which is the case when the service is MVPN or multicast VPLS, then auto-discovery unit 310 of ingress ABR 280 binds the intra-area LSP in the backbone routing area to the inter-area P2MP segmented LSP. Auto-discovery unit 310 performs the binding by re-advertising in the backbone routing area the BGP PMSI auto-discovery route that matches the BGP Leaf auto-discovery route. Auto-discovery unit 310 may, however, only advertise the binding if such a binding has not already been advertised or the binding has changed. The PMSI Tunnel attribute of the re-advertised BGP PMSI route specifies an identity of the intra-area LSP within the backbone routing area and carries an upstream assigned MPLS label of the intra-area segment carried by the intra-area LSP. If the intra-area LSP is used solely to carry an intra-area segment of one inter-area P2MP segmented LSP, the upstream-assigned MPLS label is set to an implicit null. If the intra-area LSP is used to carry two or more intra-area segments of different inter-area P2MP segmented LSPs, the upstream-assigned MPLS labels are included in label stacks of the BGP PMSI auto-discovery routes for the respective inter-area P2MP segmented LSPs.

When the RD of the received BGP Leaf auto-discovery route is zero, which is the case when the service is IP multicast, then auto-discovery unit 310 of ingress ABR 280 may originate a BGP S-PMSI auto-discovery route within the backbone area. The PMSI Tunnel attribute of the BGP PMSI auto-discovery route specifies an identity of the intra-area LSP within the egress routing area, and carries an upstream assigned MPLS label of the intra-area segment carried by the intra-area LSP. The NLRI of the BGP S-PMSI auto-discovery route includes the same RD and (S, G) entity information as the NLRI of the matching BGP Leaf auto-discovery route. Auto-discovery unit 310 of ingress ABR 280 advertises the BGP S-PMSI auto-discovery route to the egress ABRs within the backbone routing area.

For the following description, router 280 is assumed to be the root node of the inter-area P2MP segmented LSP. When root node 280 of the inter-area P2MP segmented LSP receives a BGP Leaf auto-discovery route, or a withdraw of a previously received BGP Leaf auto-discovery route, and the Route Target Extended Community carried by the route contains the IP address of root node 280, then signaling unit 312 of root node 280 may establish an intra-area LSP to carry an ingress area segment of the inter-area P2MP segmented LSP with root node 280 as the root node and one or more ingress ABRs as its leaf nodes.

Root node 280 and the other routers within the ingress routing area may independently select one of RSVP-TE 288 or mLDP 300 as the intra-area label distribution protocol for the ingress routing area. Signaling unit 312 may either graft a leaf node specified in the received BGP Leaf auto-discovery route into an existing intra-area LSP rooted at root node 280, or originate a new intra-area LSP within the ingress routing area. In some examples, signaling unit 312 may build an intra-area LSP solely used to carry an intra-area segment of one inter-area P2MP segmented LSP. In other examples, signaling unit 312 may build an intra-area aggregate LSP used to carry two more intra-area segments of different inter-area P2MP segmented LSPs. Auto-discovery unit 314 may nest the intra-area segments within the intra-area aggregate LSP by aggregating the forwarding state of the different inter-area P2MP segmented LSPs.

When the RD of the received BGP Leaf auto-discovery route is not zero, which is the case when the service is MVPN or multicast VPLS, then auto-discovery unit 310 of root node 280 binds the intra-area LSP in the ingress routing area to the inter-area P2MP segmented LSP. Auto-discovery unit 310 performs the binding by re-advertising in the ingress routing area the BGP PMSI auto-discovery route that matches the BGP Leaf auto-discovery route. Auto-discovery unit 310 may, however, only advertise the binding if such a binding has not already been advertised or the binding has changed. The PMSI Tunnel attribute of the re-advertised BGP PMSI route specifies an identity of the intra-area LSP within the ingress routing area and carries an upstream assigned MPLS label of the intra-area segment carried by the intra-area LSP. If the intra-area LSP is used solely to carry an intra-area segment of one inter-area P2MP segmented LSP, the upstream-assigned MPLS label is set to an implicit null. If the intra-area LSP is used to carry two or more intra-area segments of different inter-area P2MP segmented LSPs, the upstream-assigned MPLS labels are included in label stacks of the BGP PMSI auto-discovery routes for the respective inter-area P2MP segmented LSPs.

When the RD of the received BGP Leaf auto-discovery route is zero, which is the case when the service is IP multicast, then auto-discovery unit 310 of root node 280 may originate a BGP S-PMSI auto-discovery route within the backbone area. The PMSI Tunnel attribute of the BGP PMSI auto-discovery route specifies an identity of the intra-area LSP within the ingress routing area, and carries an upstream assigned MPLS label of the intra-area segment carried by the intra-area LSP. The NLRI of the BGP S-PMSI auto-discovery route includes the same RD and (S, G) entity information as the NLRI of the matching BGP Leaf auto-discovery route. Auto-discovery unit 310 of root node 280 advertises the BGP S-PMSI auto-discovery route to the egress ABRs within the ingress routing area.

The architecture of router 280 illustrated in FIG. 6 is shown for exemplary purposes only. The invention is not limited to this architecture. In other embodiments, router 280 may be configured in a variety of ways. In one embodiment, for example, some of the functionally of control unit 282 may be distributed within IFCs 320. In another embodiment, control unit 282 may include a routing engine that performs routing functions and maintains routing information base (RIB), e.g., routing information 308, and a forwarding engine that performs packet forwarding based on a forwarding information base (FIB), e.g., forwarding information 308, generated in accordance with the RIB.

Control unit 282 may be implemented solely in software, or hardware, or may be implemented as a combination of software, hardware, or firmware. For example, control unit 282 may include one or more processors which execute software instructions. In that case, the various software modules of control unit 282 may comprise executable instructions stored on a computer-readable medium, such as computer memory or hard disk.

Figure 7:
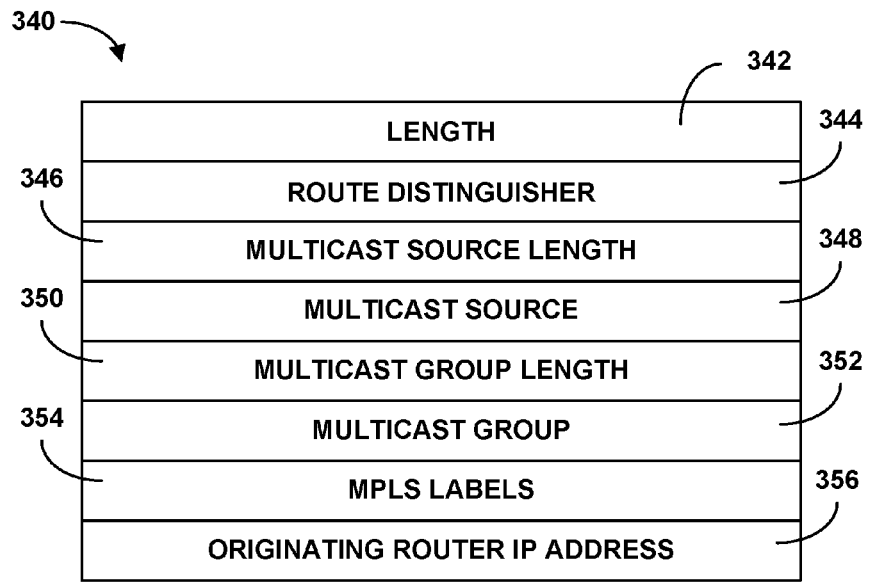
FIG. 7 illustrates an exemplary NLRI encoding of a BGP auto-discovery route when a service carried on an inter-area P2MP segmented LSP is MVPN or multicast VPLS.

FIG. 7 illustrates an exemplary network layer reachability information (NLRI) encoding 340 of a BGP auto-discovery route when a service carried on an inter-area P2MP segmented LSP is MVPN or multicast VPLS. NLRI encoding 340 may be included in a Route Key field of a BGP auto-discovery route, such as an upstream BGP Leaf auto-discovery route or a downstream BGP PMSI route used to establish an inter-area P2MP segmented LSP.

NLRI encoding 340 includes a length field 342, a route distinguisher (RD) field 344, a multicast source length field 346, a multicast source field 348, a multicast group length field 350, a multicast group field 352, a MPLS labels field 354, and an originating router IP address field 356. Length field 342 comprises two octets, RD field 344 comprises eight octets, multicast source length field 346 comprises one octet, and multicast group length field 350 comprises one octet. The remaining fields of NLRI encoding 340 comprise variable field lengths. Length field 342 provides the bit length of the entire NLRI encoding 340 including the set length and the variable length fields. RD field 344 uniquely identifies the BGP auto-discovery route. Multicast source field 348 and multicast group field 352 specify a customer multicast source address and a customer multicast group address, respectively, for the multicast communications carried by the inter-area P2MP segmented LSP. MPLS labels 354 provides a MPLS label stack for routing multicast communications along the inter-area P2MP segmented LSP. Originating router IP address field 356 specifies an IP address of the router that originated the BGP auto-discovery route.

In addition to NLRI encoding 340, MVPN/multicast VPLS BGP auto-discovery routes may also include a P-Tunnel attribute with the Leaf Information Required flag set such that a BGP PMSI auto-discovery route must be advertised in a routing area before any BGP Leaf auto-discovery route may be advertised in the same routing area. Moreover, the BGP auto-discovery routes may include a Route Target Extended Communities attribute to constrain distribution of the route that specifies a BGP next hop of the BGP auto-discovery route. The BGP auto-discovery routes may include an MP_REACH_NLRI attribute with its next hop field set to the same IP address as included in originating router IP address field 356. In addition, the BGP auto-discovery routes may include a PMSI Tunnel attribute that specifies an identity of an intra-area LSP rooted at the originating router and an upstream-assigned MPLS label of the intra-area segment carried by the intra-area LSP.

A root node of an inter-area P2MP segmented LSP may advertise its identity using NLRI encoding 340 of a BGP PMSI auto-discovery route to encode the P2MP FEC of the inter-area P2MP segmented LSP. Egress and ingress ABRs along the route toward one or more leaf nodes of inter-area P2MP segmented LSP act as route reflectors to re-advertise the BGP PMSI auto-discovery route with the same NLRI encoding 340. The ABRs do not update the BGP next hop when re-advertising the BGP PMSI auto-discovery route.

Upon discovering the identity of the inter-area P2MP segmented LSP based on the P2MP FEC, one or more leaf nodes of the inter-area P2MP segmented LSP may originate BGP Leaf auto-discovery routes with the same NLRI encoding 340 from which the P2MP FEC was discovered. Egress and ingress ABRs along the route toward the root node of inter-area P2MP segmented LSP act as route reflectors and similarly originate BGP Leaf auto-discovery routes with the same NLRI encoding 340. For each originated BGP Leaf auto-discovery route, originating router IP address field 356 is set to the IP address of the router originating the BGP Leaf auto-discovery route. In addition, the MP_REACH_NLRI attribute of the BGP Leaf auto-discovery route may be updated to specify the same IP address as originating route IP address field 356, and the Route Target Extended Communities attribute may be updated to specify the next hop on the upstream route toward the root node of the inter-area P2MP segmented LSP.

After establishing intra-area LSPs based on the received BGP Leaf auto-discovery routes, the root node, ingress ABRs, and egress ABRs act as route reflectors and re-advertise BGP PMSI auto-discovery routes with the same NLRI encoding 340 of the received Leaf auto-discovery routes. The PMSI Tunnel attribute of the BGP PMSI auto-discovery routes specifies the identity of the intra-area LSP rooted at the originating router and an upstream-assigned MPLS label of the intra-area segment carried by the intra-area LSP. The ABRs do not update the BGP next hop when re-advertising the BGP PMSI auto-discovery route.

Figure 8:
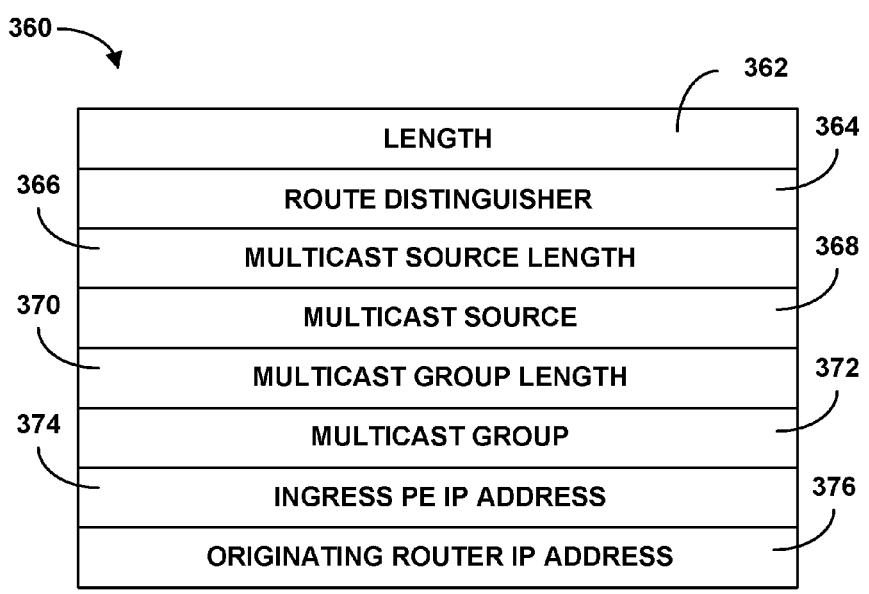
FIG. 8 illustrates an exemplary NLRI encoding of a BGP auto-discovery route when a service carried on an inter-area P2MP segmented LSP is IP multicast.

FIG. 8 illustrates an exemplary NLRI encoding 360 of a BGP auto-discovery route when a service carried on an inter-area P2MP segmented LSP is IP multicast. NLRI encoding 360 may be included in a Route Key field of a BGP auto-discovery route, such as an upstream BGP Leaf auto-discovery route or a downstream BGP PMSI route used to establish an inter-area P2MP segmented LSP.

NLRI encoding 360 includes a length field 362, a RD field 364, a multicast source length field 366, a multicast source field 368, a multicast group length field 370, a multicast group field 372, an ingress PE IP address field 374, and an originating router IP address field 376. Length field 362 comprises two octets, RD field 364 comprises eight octets, multicast source length field 366 comprises one octet, and multicast group length field 370 comprises one octet. The remaining fields of NLRI encoding 360 comprise variable field lengths.

Length field 362 provides the bit length of the entire NLRI encoding 360 including the set length and the variable length fields. RD field 364 uniquely identifies the BGP auto-discovery route. For example, RD field 364 is set to 0 for (S, G) state and set to all 1s for (*, G) state. Multicast source field 368 and multicast group field 372 specify a customer multicast source address and a customer multicast group address, respectively, for the multicast communications carried by the inter-area P2MP segmented LSP. For example, multicast source field 368 is set to S for (S, G) state or the root node/rendezvous point (RP) for (*, G) state. Multicast group field 372 is set to G. Multicast source length field 366 and multicast group length field 379 is set to either 4 or 16 depending on whether the source and group addresses are IPv4 or IPv6 addresses. Ingress PE IP address 374 specifies an IP address of the next hop of the route toward the root node of the inter-area P2MP segmented LSP. Originating router IP address field 376 specifies an IP address of the router that originated the BGP auto-discovery route.

In addition to NLRI encoding 360, IP multicast BGP auto-discovery routes may also include a Route Target Extended Communities attribute to constrain distribution of the route that specifies a BGP next hop of the BGP auto-discovery route. The BGP auto-discovery routes may include an MP_REACH_NLRI attribute with its next hop field set to the same IP address as included in originating router IP address field 376. In addition, the BGP auto-discovery routes may include a PMSI Tunnel attribute that specifies an identity of an intra-area LSP rooted at the originating router.

When the service carried by the inter-area P2MP segmented LSP is IP multicast, the leaf nodes discover the P2MP FEC of the inter-area P2MP segmented LSP from source-group (S/*, G) entries of a multicast stream from IGMP or PIM messages received on IP multicast interfaces of the leaf nodes. Upon discovering the identity of the inter-area P2MP segmented LSP based on the P2MP FEC, the leaf nodes of the inter-area P2MP segmented LSP may originate BGP Leaf auto-discovery routes with NLRI encoding 360. Egress and ingress ABRs along the route toward the root node of inter-area P2MP segmented LSP act as route reflectors and similarly originate BGP Leaf auto-discovery routes with the same NLRI encoding 360. For each originated BGP Leaf auto-discovery route, originating router IP address field 376 is set to the IP address of the router originating the BGP Leaf auto-discovery route. In addition, the MP_REACH_NLRI attribute of the BGP Leaf auto-discovery route may be updated to specify the same IP address as originating route IP address field 376, and the Route Target Extended Communities attribute may be updated to specify the next hop on the upstream route toward the root node of the inter-area P2MP segmented LSP.

After establishing intra-area LSPs based on the received BGP Leaf auto-discovery routes, the root node and ingress ABRs originate BGP PMSI auto-discovery routes with the same NLRI encoding 360 of the received Leaf auto-discovery routes. The PMSI Tunnel attribute of the BGP PMSI auto-discovery routes specifies the identity of the intra-area LSP rooted at the originating router and an upstream-assigned MPLS label of the intra-area segment carried by the intra-area LSP. For each originated BGP PMSI auto-discovery route, originating router IP address field 376 is set to the IP address of the router originating the BGP PMSI auto-discovery route. In addition, the MP_REACH_NLRI attribute of the BGP PMSI auto-discovery route may be updated to specify the same IP address as originating route IP address field 376, and the Route Target Extended Communities attribute may be updated to specify the next hop on the downstream route toward the leaf nodes of the inter-area P2MP segmented LSP.

When the intra-area label distribution protocol is RSVP-TE, the egress ABRs do not originate BGP PMSI auto-discovery routes to the leaf nodes and do not assign MPLS labels to the intra-area segments in the egress routing area. When the intra-area label distribution protocol is mLDP, the egress ABRs do originate BGP PMSI auto-discovery routes to the leaf nodes, but do not assign MPLS labels to the intra-area segments in the egress routing areas. In both cases, the leaf nodes of the inter-area P2MP segmented LSP may forward multicast traffic using IP multicast forwarding information included in the leaf nodes.

Figure 9:
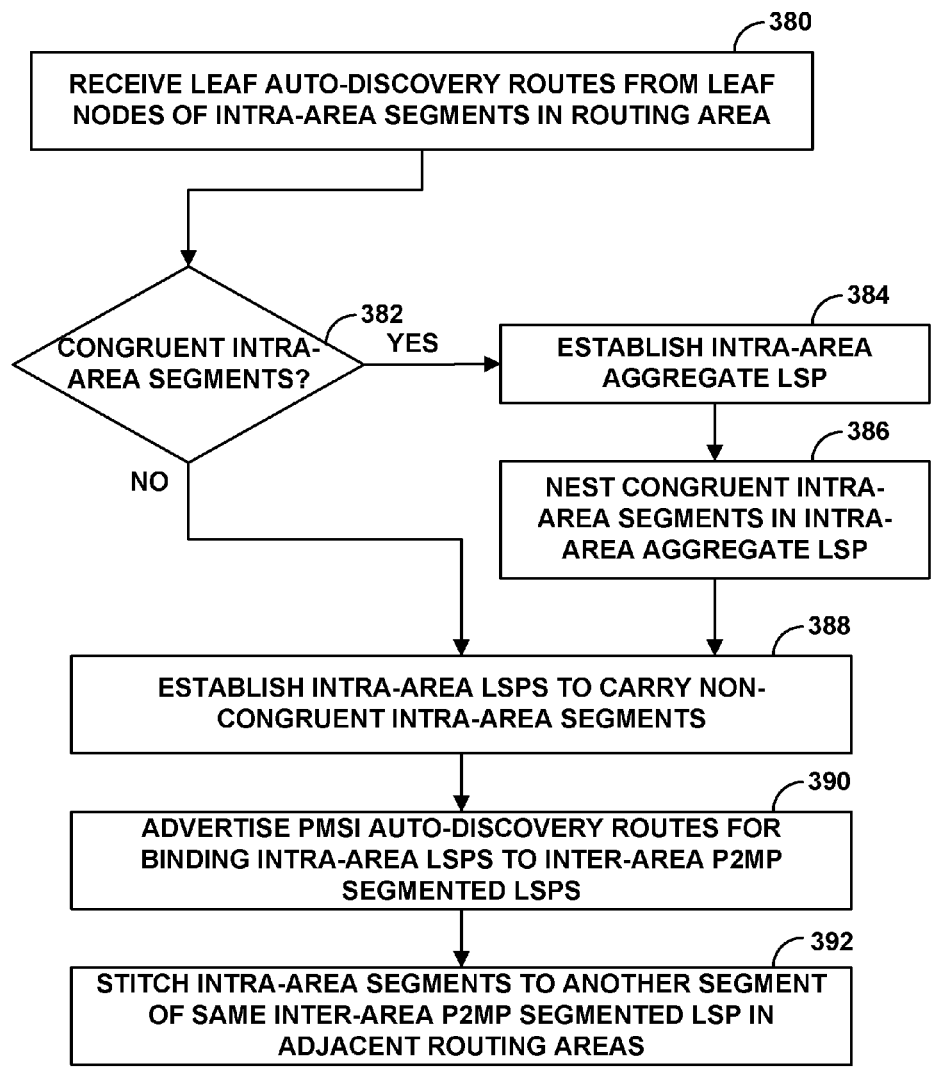
FIG. 9 is a flow chart illustrating a procedure for establishing intra-area LSPs within a routing area of an AS to carry an intra-area segment of an inter-area P2MP segmented LSP.

FIG. 9 is a flow chart illustrating a procedure for establishing intra-area LSPs within a routing area of an AS to carry an intra-area segment of an inter-area P2MP segmented LSP. The procedure of FIG. 9 may be performed by an ingress PE router, an ingress ABR, or an egress ABR within an AS. The procedure will be described in accordance with router 280 of FIG. 6.

Auto-discovery unit 310 of router 280 receives BGP Leaf auto-discovery routes from leaf nodes of one or more intra-area segments within a routing area (380). The intra-area segments may be segments of different inter-area P2MP segmented LSPs. For example, if router 280 is an egress ABR, it may receive BGP Leaf auto-discovery routes from one or more egress PEs that are leaf nodes of an egress area segment. If router 280 is an ingress ABR, it may receive BGP Leaf auto-discovery routes from one or more egress ABRs that are leaf nodes of a backbone area segment. If router 280 is an ingress PE, it may receive BGP Leaf auto-discovery routes from one or more ingress ABRs that are leaf nodes of an ingress area segment.

Signaling unit 312 of router 280 may then determine whether two or more of the intra-area segments are congruent based on the received BGP Leaf auto-discovery routes (382). If two or more of the intra-area segments of the different inter-area P2MP segmented LSPs are rooted at router 380 and have at least one common leaf node in the routing area, then they are at least partially congruent within in the routing area. If the two or more of the intra-area segments share all the same leaf nodes in the routing area, then they are fully congruent within the routing area. When two or more of the intra-area segments are either fully or partially congruent (Yes of 382), signaling unit 312 of router 280 establishes an intra-area aggregate LSP within the routing area (384). Signaling unit 312 may establish the intra-area aggregate LSP according to the received BGP Leaf auto-discovery routes. Auto-discovery unit 310 may then nest the two or more congruent intra-area segments in the intra-area aggregate LSP (386).

When none of the intra-area segments are congruent (No of 382), or when at least one of the intra-area segments is not congruent with the other segments in the routing area, signaling unit 312 of router 280 establishes separate intra-area LSPs to carry these non-congruent intra-area segments (388). Signaling unit 312 may establish the intra-area LSPs according to the received BGP Leaf auto-discovery routes.

Upon establishing the intra-area LSPs, auto-discovery unit 310 of router 280 may advertise a binding of the intra-area LSPs to the inter-area P2MP segmented LSPs within the routing area using a BGP PMSI auto-discovery route (390). For example, if router 280 is an ingress PE, auto-discovery unit 310 may advertise the BGP PMSI auto-discovery route for the binding to the leaf nodes of the intra-area segments within the ingress routing area. If router 280 is an ingress ABR, auto-discovery unit 310 may advertise the BGP PMSI auto-discovery route for the binding to the leaf nodes of the intra-area segments within the backbone routing area. If router 280 is an egress ABR and the service carried by the inter-area P2MP segmented LSPs is either MVPN or multicast VPLS, auto-discovery unit 310 may advertise the BGP PMSI auto-discovery route for the binding to the leaf nodes of the intra-area segments within the egress routing area. If, however, router 280 is an egress ABR and the service carried by the inter-area P2MP segmented LSPs is IP multicast, router 280 may not bind the intra-area segments to the inter-area P2MP segmented LSPs within the egress routing area.

If router 280 is either an ingress ABR or an egress ABR, stitching unit 316 of router 280 may stitch each of the intra-area segments within the routing area to another segment of the same inter-area P2MP segmented LSP in an adjacent routing area (392). For example, if router 280 is an ingress ABR, stitching unit 316 may stitch an intra-area segment of an inter-area P2MP segmented LSP within the ingress routing area to an intra-area segment of the same inter-area P2MP segmented LSP within the backbone area. If router 280 is an egress ABR, stitching unit 316 may stitch an intra-area segment of an inter-area P2MP segmented LSP within the backbone routing area to an intra-area segment of the same inter-area P2MP segmented LSP within the egress area. By stitching each of the intra-area segments together, router 280 establishes at least a portion of the inter-area P2MP segmented LSP within the AS.

Figure 10:
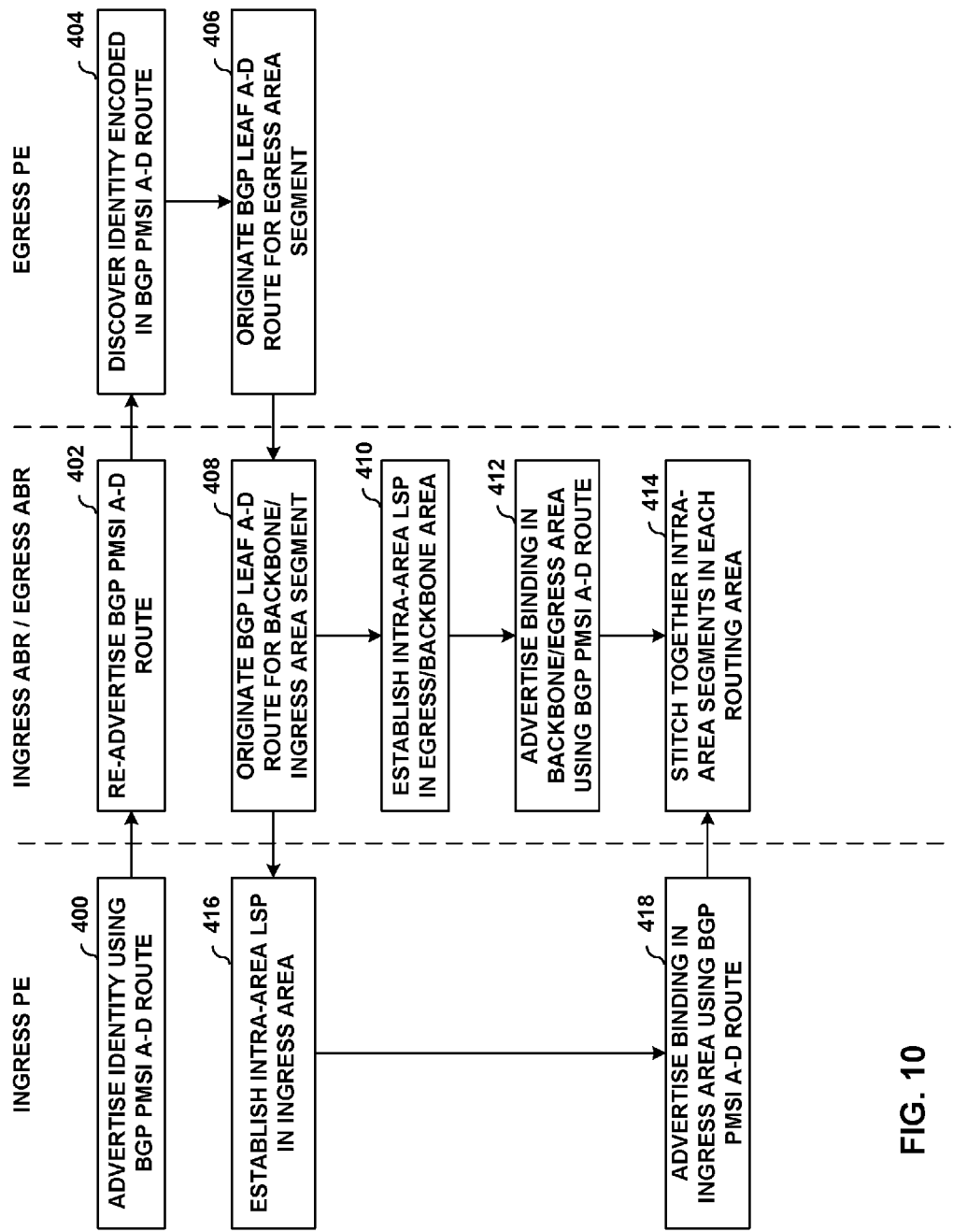
FIG. 10 is a flow chart illustrating signaling procedures for setting up an inter-area P2MP segmented LSP within an AS in a MVPN or multicast VPLS instance.

FIG. 10 is a flow chart illustrating signaling procedures for setting up an inter-area P2MP segmented LSP within an AS in a MVPN or multicast VPLS instance. The procedures of FIG. 10 are performed by an ingress PE router, an ingress ABR, an egress ABR, and an egress ABR within a single AS. In order to simplify explanation, the procedures performed by the ingress ABR and the egress ABR will be described together. The procedures will be described in accordance with AS 30 of FIG. 1, and specifically ingress PE1 50, ingress ABR2 42, egress ABR4 46, and egress PE5 58. The procedures of FIG. 10 are limited to the case where the service carried by inter-area P2MP segmented LSP 31 is either MVPN or multicast VPLS.

Ingress PE1 50 first advertises an identity of inter-area P2MP segmented LSP 31 by encoding a P2MP FEC associated with inter-area P2MP segmented LSP 31 in a BGP PMSI auto-discovery (A-D) route (400). Each of ingress ABR2 42 and egress ABR4 46 act as route reflectors and re-advertise the BGP PMSI auto-discovery route toward the leaf nodes of inter-area P2MP segmented LSP 31 (402). Egress PE5 58 discovers the indentify of inter-area P2MP segmented LSP 31 from the P2MP FEC encoded in the received BGP PMSI auto-discovery route originated by ingress PE1 50 (404). Egress PE5 58 may then originate a BGP Leaf auto-discovery route toward ingress PE1 50 to advertise itself as a leaf node of egress area segment 72 of inter-area P2MP segmented LSP 31 (406).

Egress ABR4 46 originates a BGP Leaf auto-discovery route toward ingress PE1 50 to advertise itself as a leaf node of backbone area segment 68 of inter-area P2MP segmented LSP 31 (408). Egress ABR4 46 uses the same NLRI as the BGP Leaf auto-discovery route received from egress PE5 58, but changes the originating router IP address and the next hop information. Egress ABR4 46 then establishes an intra-area LSP within egress routing area 38 to carry egress area segment 72 (410). Next, egress ABR4 46 advertises a binding of the intra-area LSP to inter-area P2MP segmented LSP 31 within egress routing area 38 using a BGP PMSI auto-discovery route (412). Egress ABR4 46 may re-advertise the same BGP PMSI auto-discovery route originated by ingress PE1 50, and include an identity of the intra-area LSP and an upstream-assigned MPLS label of egress area segment 72.

Ingress ABR2 42 also originates a BGP Leaf auto-discovery route toward ingress PE1 50 to advertise itself as a leaf node of ingress area segment 64 of inter-area P2MP segmented LSP 31 (408). Ingress ABR2 42 uses the same NLRI as the BGP Leaf auto-discovery route received from egress ABR4 46, but changes the originating router IP address and the next hop information. Ingress ABR2 42 then establishes an intra-area LSP within backbone routing area 34 to carry backbone area segment 68 (410). Next, ingress ABR2 42 advertises a binding of the intra-area LSP to inter-area P2MP segmented LSP 31 within backbone routing area 34 using a BGP PMSI auto-discovery route (412). Ingress ABR2 42 may re-advertise the same BGP PMSI auto-discovery route originated by ingress PE1 50, and include an identity of the intra-area LSP and an upstream-assigned MPLS label of backbone area segment 68.

Ingress PE1 50 establishes an intra-area LSP within ingress routing area 32 to carry ingress area segment 64 (416). Ingress PE1 50 then advertises a binding of the intra-area LSP to inter-area P2MP segmented LSP 31 within ingress routing area 32 using a BGP PMSI auto-discovery route (418). Ingress PE1 50 may re-advertise the same BGP PMSI auto-discovery route it originated, and include an identity of the intra-area LSP and an upstream-assigned MPLS label of ingress area segment 64.

Upon receiving the binding advertisement from ingress PE1 50, ingress ABR2 42 may stitch ingress area segment 64 to backbone area segment 68 to establish at least a portion of inter-area P2MP segmented LSP 31 (414). More specifically, ingress ABR2 42 may associate a leaf node of the intra-area LSP that carries ingress area segment 64 with a root node of the intra-area LSP that carries backbone area segment 68. Egress ABR4 46 may stitch backbone area segment 68 to egress area segment 72 upon receiving the binding advertisement from ingress ABR2 42 (414). More specifically, egress ABR4 46 may associate a leaf node of the intra-area LSP that carries backbone area segment 68 with a root node of the intra-area LSP that carries egress area segment 72. By stitching the intra-area segments together, ingress ABR2 42 and egress ABR4 46 establish inter-area P2MP segmented LSP 31.

Figure 11:
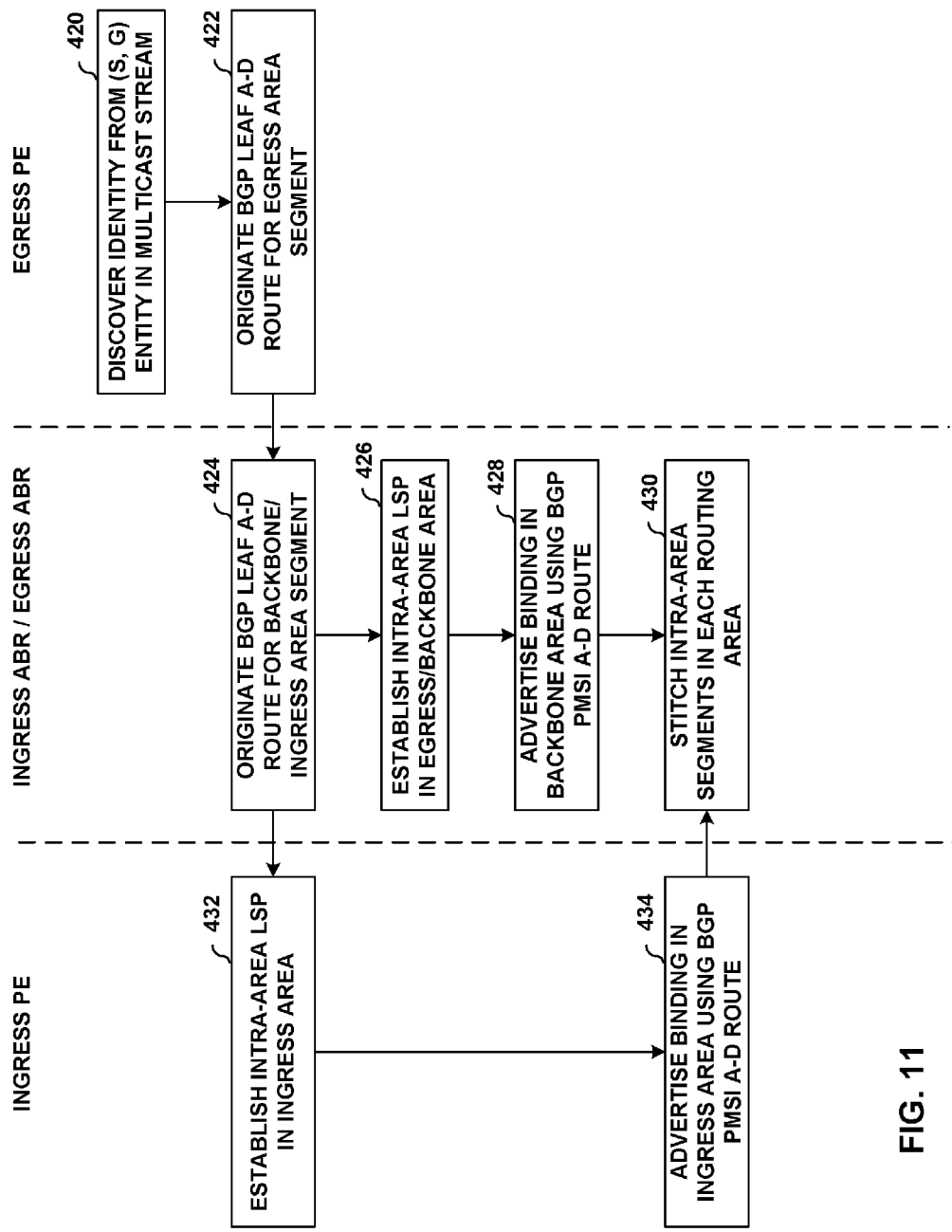
FIG. 11 is a flow chart illustrating signaling procedures for setting up an inter-area P2MP segmented LSP within an AS in an IP multicast instance.

FIG. 11 is a flow chart illustrating signaling procedures for setting up an inter-area P2MP segmented LSP within an AS in an IP multicast instance. The procedures of FIG. 11 are performed by an ingress PE router, an ingress ABR, an egress ABR, and an egress ABR within a single AS. In order to simplify explanation, the procedures performed by the ingress ABR and the egress ABR will be described together. The procedures will be described in accordance with AS 30 of FIG. 1, and specifically ingress PE1 50, ingress ABR2 42, egress ABR4 46, and egress PE5 58. The procedures of FIG. 11 are limited to the case where the service carried by inter-area P2MP segmented LSP 31 is IP multicast.

Egress PE5 58 first discovers the identity of inter-area P2MP segmented LSP 31 from a source-group (S, G) entity within a multicast stream received by egress PE5 58 (420). Egress PE5 58 may then originate a BGP Leaf auto-discovery route toward ingress PE1 50 to advertise itself as a leaf node of egress area segment 72 of inter-area P2MP segmented LSP 31 (422).

Egress ABR4 46 originates a BGP Leaf auto-discovery route toward ingress PE1 50 to advertise itself as a leaf node of backbone area segment 68 of inter-area P2MP segmented LSP 31 (424). Egress ABR4 46 uses the same NLRI as the BGP Leaf auto-discovery route received by egress PE5 42, but changes the originating router IP address and the next hop information. Egress ABR4 46 then establishes an intra-area LSP within egress routing area 38 to carry egress area segment 72 (426). In this case, egress ABR4 46 does not advertise a binding of the intra-area LSP to inter-area P2MP segmented LSP 31 within egress routing area 38. Instead, the leaf nodes of inter-area P2MP segmented LSP 31 may forward multicast traffic using IP multicast forwarding information stored in the leaf nodes.

Ingress ABR2 42 also originates a BGP Leaf auto-discovery route toward ingress PE1 50 to advertise itself as a leaf node of ingress area segment 64 of inter-area P2MP segmented LSP 31 (424). Ingress ABR2 42 uses the same NLRI as the BGP Leaf auto-discovery route received by egress ABR4 46, but changes the originating router IP address and the next hop information. Ingress ABR2 42 then establishes an intra-area LSP within backbone routing area 34 to carry backbone area segment 68 (426). Next, ingress ABR2 42 advertises a binding of the intra-area LSP to inter-area P2MP segmented LSP 31 within backbone routing area 34 using a BGP PMSI auto-discovery route (428). Ingress ABR2 42 may originate a BGP PMSI auto-discovery route, and include an identity of the intra-area LSP and an upstream-assigned MPLS label of backbone area segment 68.

Ingress PE1 50 establishes an intra-area LSP within ingress routing area 32 to carry ingress area segment 64 (432). Ingress PE1 50 then advertises a binding of the intra-area LSP to inter-area P2MP segmented LSP 31 within ingress routing area 32 using a BGP PMSI auto-discovery route (434). Ingress PE1 50 may originate a BGP PMSI auto-discovery route, and include an identity of the intra-area LSP and an upstream-assigned MPLS label of ingress area segment 64.

Upon receiving the binding advertisement from ingress PE1 50, ingress ABR2 42 may stitch ingress area segment 64 to backbone area segment 68 to establish at least a portion of inter-area P2MP segmented LSP 31 (430). More specifically, ingress ABR2 42 may associate a leaf node of the intra-area LSP that carries ingress area segment 64 with a root node of the intra-area LSP that carries backbone area segment 68. Egress ABR4 46 may stitch backbone area segment 68 to egress area segment 72 upon receiving the binding advertisement from ingress ABR2 42 (430). More specifically, egress ABR4 46 may associate a leaf node of the intra-area LSP that carries backbone area segment 68 with a root node of the intra-area LSP that carries egress area segment 72. By stitching the intra-area segments together, ingress ABR2 42 and egress ABR4 46 establish inter-area P2MP segmented LSP 31.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable media, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method of establishing inter-area point-to-multipoint (P2MP) segmented label switched paths (LSPs) across two or more routing areas within an autonomous system (AS) of a public network, the method comprising:

advertising, with an egress network device in a first routing area, a first border gateway protocol (BGP) Leaf auto-discovery route identifying a leaf node for a first intra-area segment of a first inter-area P2MP segmented LSP in the first routing area;

advertising, with the egress network device, a second BGP Leaf auto-discovery route identifying a leaf node for a second intra-area segment of a second inter-area P2MP segmented LSP in the first routing area, wherein the first and second BGP Leaf auto-discovery routes are used to establish an intra-area aggregate LSP within the first routing area that uses LSP hierarchy to carry the first intra-area segment of the first inter-area P2MP segmented LSP and the second intra-area segment of the second inter-area P2MP segmented LSP;

establishing the first inter-area P2MP segmented LSP across two or more routing areas within the AS by stitching, with the egress network device, the first intra-area segment carried by the intra-area aggregate LSP in the first routing area to other intra-area segments of the first inter-area P2MP segmented LSP within a second routing area based on labels advertised in BGP; and establishing the second inter-area P2MP segmented LSP across two or more routing areas within the AS by stitching, with the egress network device, the second intra-area segment carried by the intra-area aggregate LSP in the first routing area to other intra-area segments of the second inter-area P2MP segmented LSP within the second routing area based on labels advertised in BGP.

2. The method of claim 1, wherein the intra-area aggregate LSP is established within the first routing area when the first and second intra-area segments are at least partially congruent within the first routing area, regardless of whether the first and second inter-area P2MP segmented LSPs are not even partially congruent within the AS.

3. The method of claim 1, the method further comprising binding the intra-area aggregate LSP to the first inter-area P2MP segmented LSP and the second inter-area P2MP segmented LSP within the first routing area.

4. The method of claim 3, wherein binding the intra-area aggregate LSP to the first inter-area P2MP segmented LSP comprises receiving a first BGP Provider Multicast Service Interface (PMSI) auto-discovery route for the first inter-area P2MP segmented LSP that includes an identity of the intra-area aggregate LSP and an upstream-assigned Multi-Protocol Label Switching (MPLS) label of the first intra-area segment, and wherein establishing the first inter-area P2MP segmented LSP comprises stitching the first intra-area segment in the first routing area to the other intra-area segments in the second routing area based on the first BGP PMSI auto-discovery route.

5. The method of claim 3, wherein binding the intra-area aggregate LSP to the second inter-area P2MP segmented LSP comprises receiving a second BGP Provider Multicast Service Interface (PMSI) auto-discovery route for the second inter-area P2MP segmented LSP that includes an identity of the intra-area aggregate LSP and an upstream-assigned Multi-Protocol Label Switching (MPLS) label of the second intra-area segment, and wherein establishing the second inter-area P2MP segmented LSP comprises stitching the second intra-area segment in the first routing area to the other intra-area segments in the second routing area based on the second BGP PMSI auto-discovery route.

6. The method of claim 1, wherein a multicast Multi-Protocol Label Switching (MPLS) protocol is independently selected as an intra-area label distribution protocol for the first routing area, and wherein the intra-area aggregate LSP is established within the first routing area based on the first and second BGP Leaf auto-discovery routes using the selected multicast MPLS protocol for the first routing area.

7. The method of claim 1, wherein the two or more routing areas comprise Interior Gateway Protocol (IGP) areas of the AS.

8. A network system of an autonomous system (AS) of a public network for establishing inter-area point-to-multipoint (P2MP) segmented label switched paths (LSPs) across two or more routing areas within the AS, the network system comprising:

an egress network device within a first routing area that advertises a first border gateway protocol (BGP) Leaf auto-discovery route identifying a leaf node for a first intra-area segment of a first inter-area P2MP segmented LSP in the first routing area, and advertises a second BGP Leaf auto-discovery route identifying a leaf node for a second intra-area segment of a second inter-area P2MP segmented LSP in the first routing area; and an ingress network device within the first routing area that establishes an intra-area aggregate LSP within the first routing area based on the first and second BGP Leaf auto-discovery routes, wherein the intra-area aggregate LSP uses LSP hierarchy to carry the first intra-area segment of the first inter-area P2MP segmented LSP and the second intra-area segment of the second inter-area P2MP segmented LSP, and advertises binding of the intra-area aggregate LSP to the first and second inter-area P2MP segmented LSPs using BGP Provider Multicast Service Interface (PMSI) auto-discovery routes that include an identity of the intra-area aggregate LSP and Multi-Protocol Label Switching (MPLS) labels of the first and second intra-area segments, wherein the egress network device establishes the first inter-area P2MP segmented LSP across two or more routing areas of the AS by stitching the first intra-area segment in the first routing area to other intra-area segments of the first inter-area P2MP segmented LSP within a second routing area based on the BGP PMSI auto-discovery routes, and wherein the egress network device establishes the second inter-area P2MP segmented LSP across two or more routing areas of the AS by stitching the second intra-area segment in the first routing area to other intra-area segments of the second inter-area P2MP segmented LSP within the second routing area based on the BGP PMSI auto-discovery routes.

9. The network system of claim 8, wherein the ingress network device establishes the intra-area aggregate LSP within the first routing area when the first and second intra-area segments are at least partially congruent within the first routing area, regardless of whether the first and second inter-area P2MP segmented LSPs are not even partially congruent within the AS.

10. The network system of claim 8, wherein the ingress network device:

receives the first BGP Leaf auto-discovery route identifying the leaf node for the first intra-area segment of the first inter-area P2MP segmented LSP within the first routing area;

receives the second BGP Leaf auto-discovery route identifying the leaf node for the second intra-area segment of the second inter-area P2MP segmented LSP within the first routing area; and establishes the intra-area aggregate LSP within the first routing area based on the first and second BGP Leaf auto-discovery routes using a multicast MPLS protocol.

11. The network system of claim 8, wherein one or more provider devices within the first routing area use LSP hierarchy to maintain forwarding and routing information for the first and second intra-area segments carried within the intra-area aggregate LSP without maintaining forwarding and routing information for the first and second inter-area P2MP segmented LSPs.

12. The network system of claim 8, wherein a multicast MPLS protocol is independently selected as an intra-area label distribution protocol for the first routing area, and wherein the ingress network device establishes the intra-area aggregate LSP within the first routing area based on the first and second BGP Leaf auto-discovery routes using the selected multicast MPLS protocol for the first routing area.

13. The network system of claim 8, wherein the two or more routing areas comprise Interior Gateway Protocol (IGP) areas of the AS.

14. An egress network device within a first routing area of an autonomous system (AS) of a public network for establishing inter-area point-to-multipoint (P2MP) segmented label switched paths (LSPs) across two or more routing areas within the AS, the network device comprising:
    a control unit configured to:
    advertise a first border gateway protocol (BGP) Leaf auto-discovery route identifying a leaf node for a first intra-area segment of a first inter-area P2MP segmented LSP in the first routing area;
    advertise a second BGP Leaf auto-discovery route identifying a leaf node for a second intra-area segment of a second inter-area P2MP segmented LSP in the first routing area, wherein the first and second BGP Leaf auto-discovery routes are used to establish an intra-area aggregate LSP within the first routing area that uses LSP hierarchy to carry the first intra-area segment of the first inter-area P2MP segmented LSP within the AS and the second intra-area segment of the second inter-area P2MP segmented LSP within the AS;
    establish the first inter-area P2MP segmented LSP across two or more routing areas of the AS by stitching the first intra-area segment carried by the intra-area aggregate LSP in the first routing area to other intra-area segments of the first inter-area P2MP segmented LSP within a second routing area based on labels advertised in BGP; and
    establish the second inter-area P2MP segmented LSP across two or more routing areas of the AS by stitching the second intra-area segment carried by the intra-area aggregate LSP in the first routing area to other intra-area segments of the second inter-area P2MP segmented LSP within the second routing area based on labels advertised in BGP.

15. An ingress network device within a first routing area of an autonomous system (AS) of a public network for establishing inter-area point-to-multipoint (P2MP) segmented label switched paths (LSPs) across two or more routing areas within the AS, the network device comprising:
    a control unit configured to:
    establish an intra-area aggregate LSP within the first routing area that uses LSP hierarchy to carry a first intra-area segment of a first inter-area P2MP segmented LSP and a second intra-area segment of a second inter-area P2MP segmented LSP;
    advertise a binding of the intra-area aggregate LSP to the first inter-area P2MP segmented LSP using a first BGP Provider Multicast Service Interface (PMSI) auto-discovery route that includes an identity of the intra-area aggregate LSP and a first Multi-Protocol Label Switching (MPLS) label of the first intra-area segment, wherein the first inter-area P2MP segmented LSP is established by stitching the first intra-area segment in the first routing area to other intra-area segments of the first inter-area P2MP segmented LSP in a second routing area based on the advertised first BGP PMSI auto-discovery route; and
    advertise a binding of the intra-area aggregate LSP to the second inter-area P2MP segmented LSP using a second BGP PMSI auto-discovery route that includes the identity of the intra-area aggregate LSP and a second MPLS label of the second intra-area segment, wherein the second inter-area P2MP segmented LSP is established by stitching the second intra-area segment in the first routing area to other intra-area segments for the second inter-area P2MP segmented LSP in the second routing area based on the advertised second BGP PMSI auto-discovery route.

16. The network device of claim 15, wherein the control unit establishes the intra-area aggregate LSP within the first routing area when the first and second intra-area segments are at least partially congruent within the first routing area, regardless of whether the first and second inter-area P2MP segmented LSPs are not even partially congruent within the AS.

17. The network device of claim 15, wherein the control unit:
    receives a first BGP Leaf auto-discovery route identifying a leaf node for the first intra-area segment of the first inter-area P2MP segmented LSP within the first routing area;
    receives a second BGP Leaf auto-discovery route identifying a leaf node for the second intra-area segment of the second inter-area P2MP segmented LSP within the first routing area; and
    establishes the intra-area aggregate LSP within the first routing area based on the first and second BGP Leaf auto-discovery routes using a multicast MPLS protocol.

18. A non-transitory computer-readable storage medium encoded with instructions for establishing inter-area point-to-multipoint (P2MP) segmented label switched paths (LSPs) across two or more routing areas within an autonomous system (AS) of a public network, the instructions causing one or more programmable processors to:
    advertise a first border gateway protocol (BGP) Leaf auto-discovery route identifying a leaf node for a first intra-area segment of a first inter-area P2MP segmented LSP in a first routing area;
    advertise a second BGP Leaf auto-discovery route identifying a leaf node for a second intra-area segment of a second inter-area P2MP segmented LSP in the first routing area, wherein the first and second BGP Leaf auto-discovery routes are used to establish an intra-area aggregate LSP within the first routing area that uses LSP hierarchy to carry the first intra-area segment of the first inter-area P2MP segmented LSP and the second intra-area segment of the second inter-area P2MP segmented LSP;

establish the first inter-area P2MP segmented LSP across two or more routing areas within the AS by stitching the first intra-area segment in the first routing area to other intra-area segments of the first inter-area P2MP segmented LSP within a second routing area based on labels advertised in BGP;

establish the second inter-area P2MP segmented LSP across two or more routing areas within the AS by stitching the first intra-area segment in the first routing area to other intra-area segments of the second inter-area P2MP segmented LSP within the second routing area based on labels advertised in BGP.

19. The non-transitory computer-readable storage medium of claim 18, further comprising instructions for causing one or more programmable processors to bind the intra-area aggregate LSP to the first inter-area P2MP segmented LSP and the second inter-area P2MP segmented LSP within the first routing area.

20. The non-transitory computer-readable storage medium of claim 19, further comprising instructions for causing one or more programmable processors to receive the binding of the intra-area aggregate LSP to the first inter-area P2MP segmented LSP within a BGP Provider Multicast Service Interface (PMSI) auto-discovery route for the first inter-area P2MP segmented LSP that includes an identity of the intra-area aggregate LSP and an upstream-assigned Multi-Protocol Label Switching (MPLS) label of the first intra-area segment, and stitch the first intra-area segment in the first routing area to the other intra-area segments in the second routing area based on the first BGP PMSI auto-discovery route.

21. The non-transitory computer-readable storage medium of claim 19, further comprising instructions for causing one or more programmable processors to receive the binding of the intra-area aggregate LSP to the second inter-area P2MP segmented LSP within a BGP Provider Multicast Service Interface (PMSI) auto-discovery route for the second inter-area P2MP segmented LSP that includes an identity of the intra-area aggregate LSP and an upstream-assigned Multi-Protocol Label Switching (MPLS) label of the second intra-area segment, and stitch the second intra-area segment in the first routing area to the other intra-area segments in the second routing area based on the second BGP PMSI auto-discovery route.

22. A method of establishing inter-area point-to-multipoint (P2MP) segmented label switched paths (LSPs) across two or more routing areas within an autonomous system (AS) of a public network, the method comprising:

establishing, with an ingress network device in a first routing area, an intra-area aggregate LSP within the first routing area that uses LSP hierarchy to carry a first intra-area segment of a first inter-area P2MP segmented LSP and a second intra-area segment of a second inter-area P2MP segmented LSP;

advertising, with the ingress network device, a binding of the intra-area aggregate LSP to the first inter-area P2MP segmented LSP using a first Border Gateway Protocol (BGP) Provider Multicast Service Interface (PMSI) auto-discovery route that includes an identity of the intra-area aggregate LSP and a first Multi-Protocol Label Switching (MPLS) label of the first intra-area segment, wherein the first inter-area P2MP segmented LSP is established by stitching the first intra-area segment in the first routing area to other intra-area segments of the first inter-area P2MP segmented LSP in a second routing area based on the advertised first BGP PMSI auto-discovery route; and advertising, with the ingress network device, a binding of the intra-area aggregate LSP to the second inter-area P2MP segmented LSP using a second BGP PMSI auto-discovery route that includes the identity of the intra-area aggregate LSP and a second MPLS label of the second intra-area segment, wherein the second inter-area P2MP segmented LSP is established by stitching the second intra-area segment in the first routing area to other intra-area segments for the second inter-area P2MP segmented LSP in the second routing area based on the advertised second BGP PMSI auto-discovery route.

23. The method of claim 22, further comprising establishing the intra-area aggregate LSP within the first routing area when the first and second intra-area segments are at least partially congruent within the first routing area, regardless of whether the first and second inter-area P2MP segmented LSPs are not even partially congruent within the AS.

24. The method of claim 22, wherein establishing the intra-area aggregate LSP comprises:

receiving a first BGP Leaf auto-discovery route identifying a leaf node for the first intra-area segment of the first inter-area P2MP segmented LSP in the first routing area;

receiving a second BGP Leaf auto-discovery route identifying a leaf node for the second intra-area segment of the second inter-area P2MP segmented LSP in the routing area; and establishing the intra-area aggregate LSP within the first routing area based on the first and second BGP Leaf auto-discovery routes using a multicast MPLS protocol.

25. The method of claim 22, further comprising advertising a first BGP Leaf auto-discovery route identifying a leaf node for a third intra-area segment of the first inter-area P2MP segmented LSP within an upstream routing area, and advertising a second BGP Leaf auto-discovery route identifying a leaf node for a fourth intra-area segment of the second inter-area P2MP segmented LSP within the upstream routing area.

26. The method of claim 22, further comprising independently selecting a multicast MPLS protocol as an intra-area label distribution protocol for the first routing area, and wherein establishing the intra-area aggregate LSP comprises establishing the intra-area aggregate LSP within the first routing area using the selected multicast MPLS protocol for the first routing area.

27. The method of claim 22, wherein the two or more routing areas comprise Interior Gateway Protocol (IGP) areas of the AS.

* * * * *